US010618444B2

(12) United States Patent
Kish et al.

(10) Patent No.: US 10,618,444 B2
(45) Date of Patent: Apr. 14, 2020

(54) SECTOR ARM AND LATCH ASSEMBLY

(71) Applicant: Ford Global Technologies, LLC, Dearborn, MI (US)

(72) Inventors: Joseph Michael Kish, Canton, MI (US); Macit Aktas, Windsor (CA); Jeffrey Gabalski, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/880,198

(22) Filed: Jan. 25, 2018

(65) Prior Publication Data
US 2019/0225130 A1    Jul. 25, 2019

(51) Int. Cl.
*B60N 2/04* (2006.01)
*B60N 2/12* (2006.01)
*B60N 2/90* (2018.01)

(52) U.S. Cl.
CPC ............. *B60N 2/943* (2018.02); *B60N 2/045* (2013.01); *B60N 2/12* (2013.01); *B60N 2002/967* (2018.02)

(58) Field of Classification Search
CPC .... B60N 2/045; B60N 2/12; B60N 2002/952; B60N 2/1695
See application file for complete search history.

(56) References Cited

U.S. PATENT DOCUMENTS

| | | | |
|---|---|---|---|
| 6,676,216 B1* | 1/2004 | Freijy | B60N 2/3013 296/65.09 |
| 7,575,280 B2 | 8/2009 | Palomba et al. | |
| 7,703,828 B2 | 4/2010 | O'Connor et al. | |
| 7,926,858 B2 | 4/2011 | Otsuka | |
| 8,950,810 B2 | 2/2015 | Dryburgh et al. | |
| 10,308,146 B1* | 6/2019 | Kish | B60N 2/12 |
| 2011/0037304 A1* | 2/2011 | Kammerer | B60N 2/12 297/340 |
| 2011/0127794 A1* | 6/2011 | Lindsay | B60N 2/12 296/65.05 |
| 2013/0292982 A1* | 11/2013 | Radermacher | B60N 2/12 297/318 |
| 2013/0328370 A1* | 12/2013 | Wilfer | B60N 2/20 297/257 |
| 2013/0341953 A1* | 12/2013 | White | B60N 2/065 296/65.01 |
| 2015/0375637 A1* | 12/2015 | Kikuchi | B60N 2/12 297/317 |
| 2016/0318424 A1* | 11/2016 | Dlugokecki | B60N 2/12 |
| 2017/0174104 A1* | 6/2017 | Raja K | B60N 2/01583 |

(Continued)

*Primary Examiner* — Timothy J Brindley
(74) *Attorney, Agent, or Firm* — David Coppiellie; Price Heneveld LLP

(57) ABSTRACT

A seating assembly comprises a seat base operably coupled to a track assembly and a latch assembly configured to couple the seat base to the track assembly. The latch assembly comprises a sector arm operably coupled to a first pivot pin and a second pivot pin, wherein the first pivot pin is operably coupled to the seat base, a striker operably coupled to the second pivot pin and including a striker pin, and a dual cam latch operably coupled to the sector arm and disposed between the first pivot pin and the second pivot pin and operable between a lowered position in which the latch assembly is engaged with the striker pin and a raised position in which the latch assembly is released.

20 Claims, 24 Drawing Sheets

(56) References Cited

U.S. PATENT DOCUMENTS

| | | | |
|---|---|---|---|
| 2017/0253146 A1* | 9/2017 | Cooley | B60N 2/12 |
| 2018/0001793 A1* | 1/2018 | Pleskot | B60N 2/161 |
| 2018/0015850 A1* | 1/2018 | Bruck | B60N 2/3013 |
| 2019/0092191 A1* | 3/2019 | Bouzid | B60N 2/164 |
| 2019/0152352 A1* | 5/2019 | Handigol | B60N 2/12 |

* cited by examiner

SECTOR ARM AND LATCH ASSEMBLY

FIELD OF THE DISCLOSURE

The present disclosure generally relates to a latch assembly. More specifically, the present disclosure relates to a latch assembly disposed on a sector arm between a first pivot axis and a second pivot axis.

BACKGROUND OF THE INVENTION

It is common to have the ability to pitch a seating assembly forward in a vehicle, particularly for vehicles where access to rear seating is only available by entering behind a front seating assembly. Because of the common use of these entries, it is desired to increase the space created for entry when the seating assembly is pitched forward.

SUMMARY OF THE INVENTION

According to a first aspect of the present disclosure, a seating assembly comprises a seat base operably coupled to a track assembly and a latch assembly configured to couple the seat base to the track assembly. The latch assembly comprises a sector arm operably coupled to a first pivot pin and a second pivot pin, wherein the first pivot pin is operably coupled to the seat base, a striker operably coupled to the second pivot pin and including a striker pin, and a dual cam latch operably coupled to the sector arm and disposed between the first pivot pin and the second pivot pin and operable between a lowered position in which the latch assembly is engaged with the striker pin and a raised position in which the latch assembly is released.

Embodiments of the first aspect of the present disclosure can include any one or a combination of the following features:
- the dual cam latch includes a locking hook defining an opening;
- a first distance measured from the opening of the locking hook to the second pivot pin is generally equivalent to a second distance measured from the second pivot pin to the striker pin; and/or
- the sector arm includes a first arm operably coupled to a second arm, and wherein the first pivot pin is operably coupled to the first arm and the second pivot pin is operably coupled to the second arm.

According to a second aspect of the present disclosure, a seating assembly comprises a seat base operably coupled to a track assembly, a sector arm operably coupled to a first pivot pin and a second pivot pin, wherein the first pivot pin is operably coupled to the seat base, a striker plate disposed on the track assembly and operably coupled to the second pivot pin, and a dual cam latch disposed between the first pivot pin and the second pivot pin and configured to engage a striker pin when in a lowered position.

Embodiments of the second aspect of the present disclosure can include any one or a combination of the following features:
- the dual cam latch includes a locking hook defining an opening;
- the striker plate includes the striker pin configured to be received by the opening of the locking hook;
- the dual cam latch is operably coupled to a mid-portion of the sector arm by an arbor pin such that the aperture is a first distance from the second pivot pin;
- the striker pin is a second distance from the second pivot pin, and wherein the second distance is generally equivalent to the first distance;
- the sector arm includes a first end and a second end, and further wherein the first end is operably coupled to the first pivot pin and the second end is operably coupled to the second pivot pin; and/or
- the first end is disposed at a predetermined angle relative to the opening of the dual cam latch, and further wherein the angle disposes the seat base to be substantially parallel to the track assembly.

According to a third aspect of the present disclosure, a seating assembly comprises a seat base operably coupled to a track assembly and a latch assembly. The latch assembly comprises a striker plate operably coupled to the track assembly, a sector arm operably coupled to the seat base and the striker plate, and a dual cam latch operably coupled to the sector arm and disposed between first and second ends of the sector arm.

Embodiments of the third aspect of the present disclosure can include any one or a combination of the following features:
- the striker plate includes a striker pin;
- the dual cam latch includes a locking hook defining an opening configured to receive the striker pin;
- the sector arm includes a first end defining a first pivot axis and a second end defining a second pivot axis;
- the second end extends a first distance from the second pivot axis, and further wherein the striker pin is disposed at a second distance from the second pivot axis;
- the first distance is generally equivalent to the second distance;
- the first end is disposed at an angle, and further wherein the angle is configured to position the seat base parallel to the track assembly when the locking hook is engaged with the striker pin;
- the dual cam latch is secured to the sector arm and a cover by an arbor pin; and/or
- the sector arm is a single continuous piece configured to support some part of the seat base.

These and other aspects, objects, and features of the present disclosure will be understood and appreciated by those skilled in the art upon studying the following specification, claims, and appended drawings.

DETAILED DESCRIPTION OF THE EMBODIMENTS

Figure 2:
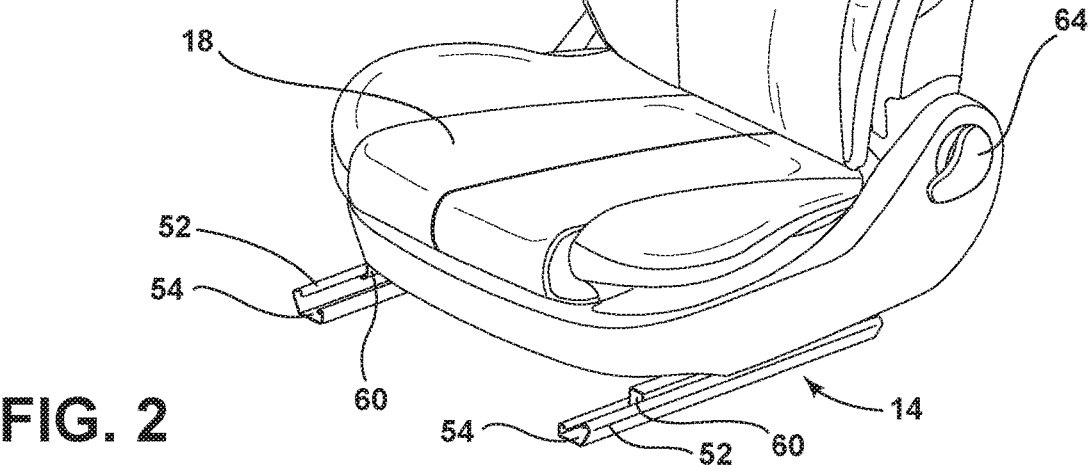
FIG. 2 is an enlarged top perspective view of the vehicle seating assembly of FIG. 1.

For purposes of description herein, the terms "upper," "lower," "right," "left," "rear," "front," "vertical," "horizontal," and derivatives thereof shall relate to the concepts as oriented in FIG. 2. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-18B, reference numeral 10 generally designates a seating assembly comprising a striker pin 12 operably coupled to a track assembly 14 and a sector arm 16 operably coupled to a seat base 18 and defining a first pivot axis α and a second pivot axis β. The seating assembly 10 further comprises a dual cam latch 24 disposed between the second pivot axis β and the seat base 18 when the sector arm 16 is in a raised position, and engageable with the striker pin 12 when the sector arm 16 is in a lowered position, wherein the dual cam latch 24 is releasable by a forward movement of a seatback 26, a release cam 28 operably coupled to the sector arm 16 along the second pivot axis β, wherein the release cam 28 is configured to rotate downward when the sector arm 16 is in the raised position, and a release bar 30 including a front portion 32 and a rear portion 34, wherein the rear portion 34 is engageable by the release cam 28.

Figure 1:
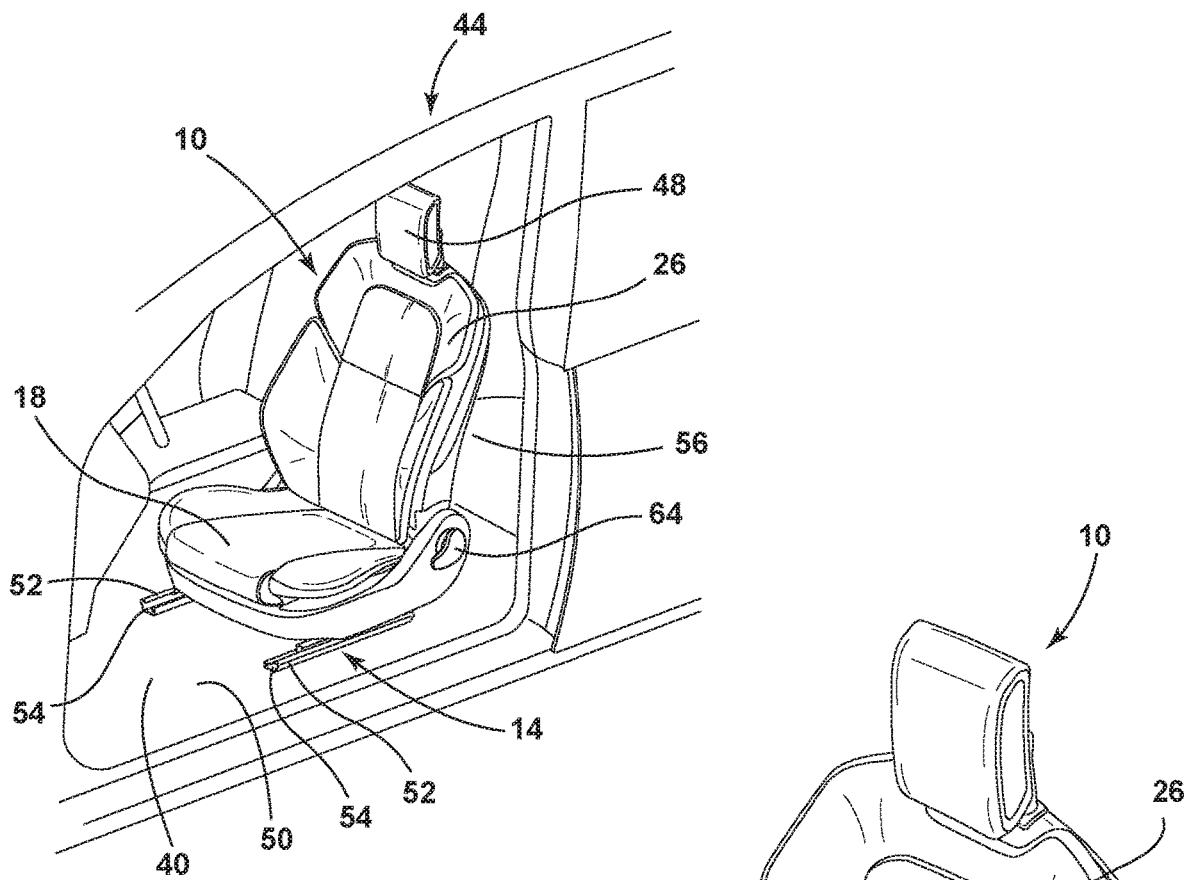
FIG. 1 is a top perspective view of one embodiment of a vehicle seating assembly.

Referring now to FIG. 1, the seating assembly 10 is shown disposed within a front portion 40 of a vehicle 44. The seating assembly 10 includes the seat base 18 and the seatback 26 and may include a headrest 48. The track assembly 14 is operably coupled to a floor 50 of the vehicle 44, and the seat base 18 is operably coupled to the track assembly 14. The track assembly 14 may include a plurality of tracks 52 each defining a channel 54. The seating assembly 10 is configured to pitch forward to allow access to a rear portion 56 of the vehicle 44. It is contemplated that the vehicle 44 may be any type of vehicle, such as a car, a truck, a van, etc. It is also contemplated that the concept set forth in this disclosure may be utilized in the front portion 40 of the vehicle 44 as well as the rear portion 56 of the vehicle 44, depending on the configuration of the vehicle 44.

Referring now to FIGS. 1 and 2, the seat base 18 of the seating assembly 10 is operably coupled to the seatback 26. The seat base 18 may be positioned on a plurality of rail slides 60 of the track assembly 14. Each of the plurality of rail slides 60 may be received by the channel 54 defined by one of the plurality of tracks 52 of the track assembly 14. The plurality of rail slides 60 may be releasably secured to the track assembly 14. Alternatively, the plurality of rail slides 60 may be slideably coupled to the track assembly 14 to allow fore and aft movement of the seating assembly 10 relative to the vehicle 44. An actuator 64 may be disposed on the seat base 18. The actuator 64 is configured to pitch the seating assembly 10 forward when actuated, lifting the rear of the seat base 18. Although the actuator 64 is shown disposed on the seat base 18 in the illustrated embodiment, it is contemplated that the actuator 64 may be disposed on the seatback 26 or in any position proximate to the seating assembly 10, depending on the configuration of the seating assembly 10, without departing from the scope of the present disclosure.

Figure 3A:
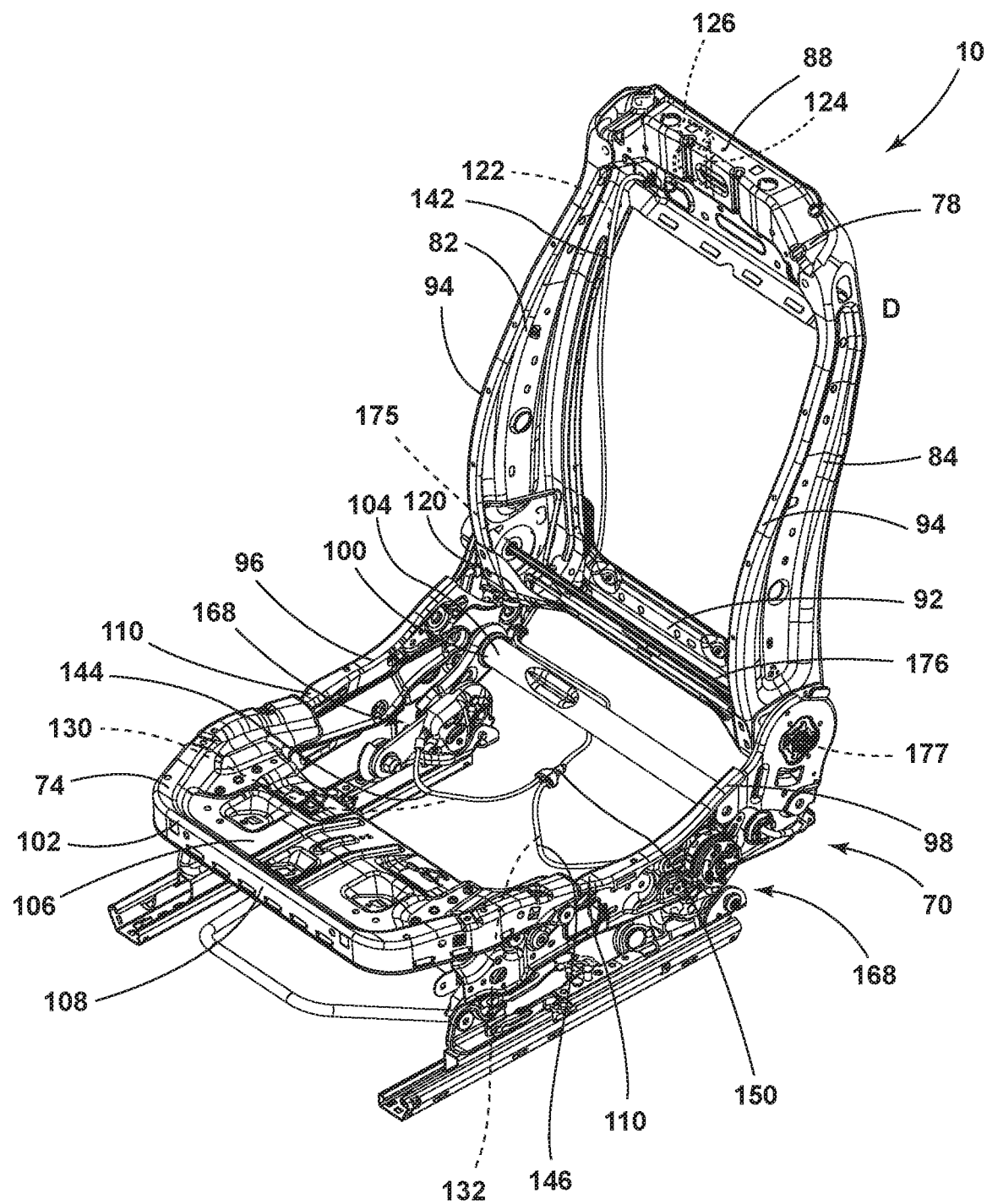
FIG. 3A is a top perspective view of a frame of an embodiment of a vehicle seating assembly with a two-way pitching mechanism in a design position.

Referring now to FIG. 3A, the seating assembly 10 is shown including a two-way pitching mechanism 70. The seating assembly 10 includes a base frame 74 and a back frame 78. The back frame 78 includes a first vertical support 82 and a second vertical support 84 joined together by a top portion 88 and a bottom portion 92. The first and second vertical supports 82, 84 may each include a curved front portion 94 and may be integrally formed with the top portion 88 and the bottom portion 92. Alternatively, the first and second vertical supports 82, 84 may be operably coupled to the top portion 88 and the bottom portion 92 using fasteners or connectors, adhesives, welding, etc. The base frame 74 includes a first horizontal support 96 and a second horizontal support 98 operably coupled to the first vertical support 82 and the second vertical support 84, respectively. The first and second horizontal supports 96, 98 may be joined by a front portion 102 and a rear portion 104. In the illustrated embodiment, the rear portion 104 includes a torsion bar 100, and the front portion 102 includes a cushion pan 106 including a lip 108 configured to secure over a top edge 110 of the first and second horizontal supports 96, 98.

Referring still to FIG. 3A, a first cable guide 120 is operably coupled to the first horizontal support 96. An actuator 124 is operably coupled to the top portion 88 of the back frame 78 and includes a second cable guide 126. A first cable 122 is received by the first cable guide 120 and extends up the back frame 78 of the seating assembly 10 to be received by the second cable guide 126. The first cable 122 further extends beneath the rear portion 104 of the base frame 74 to interface with a standard splitter 150. The standard splitter 150 operably couples the first cable 122 with a first latch cable 130 and a second latch cable 132. The first latch cable 130 is operably coupled to a latch assembly 168 operably coupled to the first horizontal support 96, and the second latch cable 132 is operably coupled to the latch assembly 168 operably coupled to the second horizontal support 98. The first cable 122 is encased by a first cable sleeve 142, and the first latch cable 130 and the second latch cable 132 are encased by a second cable sleeve 144 and a third cable sleeve 146, respectively. It will be understood that the first cable 122 may be a single cable, a plurality of individual cables, or a plurality of intertwined cables. It will further be understood that the first latch cable 130 and the second latch cable 132 may be integrally formed with the first cable 122 or the first and second latch cables 130, 132 may be a single cable. The first cable 122 and the first and second latch cables 130, 132 may be connected by any means as understood in the art. Further, it is contemplated that the first cable 122 and the first and second latch cables 130, 132 may be exposed on the underside of the base frame 74 without the cable sleeves 142, 144, 146 without departing from the scope of the present disclosure.

Figure 3B:
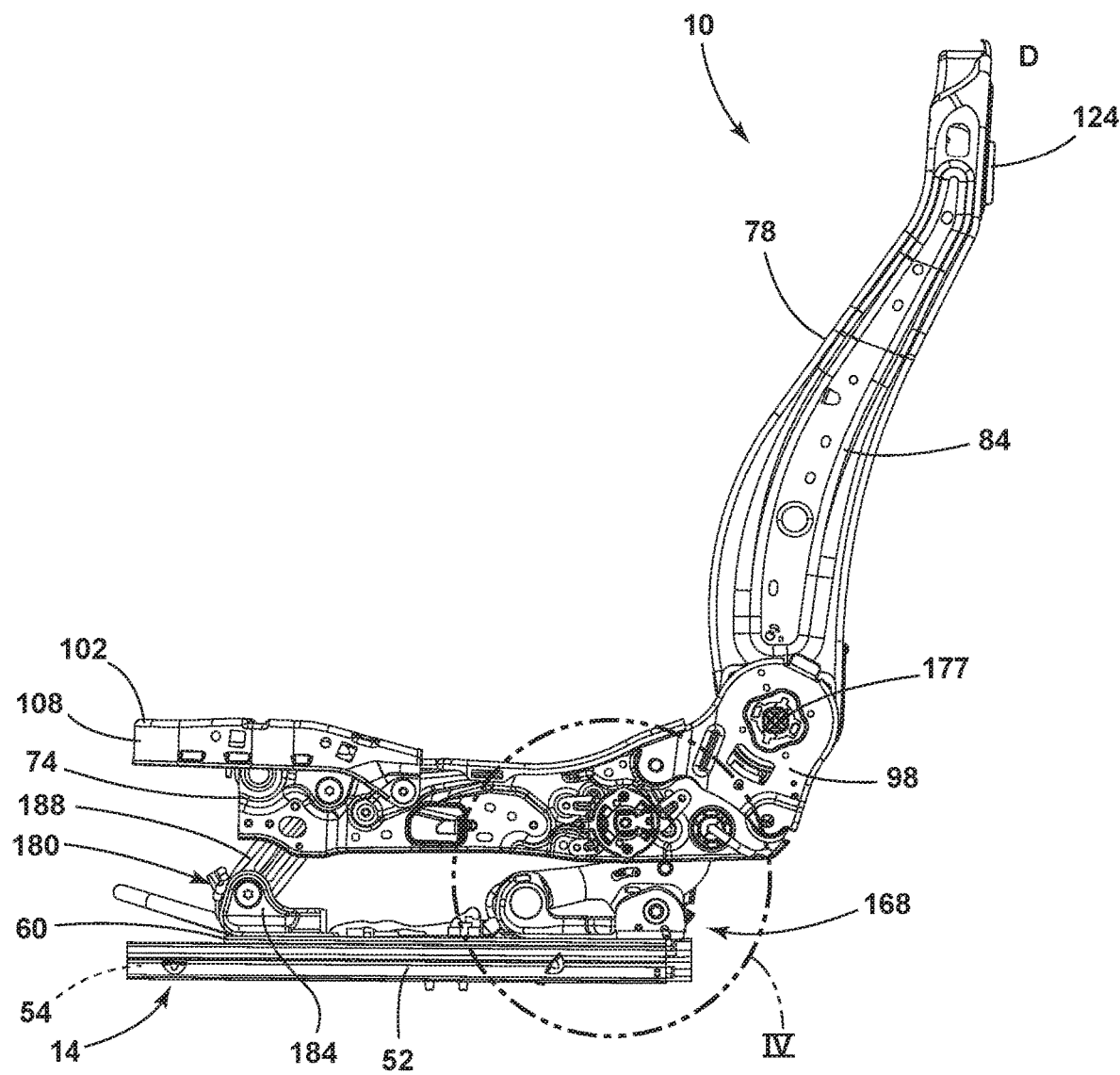
FIG. 3B is a side elevational view of the frame of FIG. 3A with the two-way pitching mechanism in the design position.

Referring now to FIG. 3B, the second horizontal support 98 and the second vertical support 84 are shown. It will be understood that the first horizontal support 96 and the first vertical support 82, though not shown, have a similar configuration. As shown in FIG. 3A, the second horizontal support 98 is fixedly coupled to the second vertical support 84 by an elongated transverse connector 176 that terminates at first and second recliner hearts 175, 177.

Still referring to FIG. 3B, the track assembly 14 is shown with one of the plurality of rail slides 60 disposed within the channel 54 defined by one of the plurality of tracks 52. In the illustrated embodiment, the second horizontal support 98 is operably coupled to the rail slide 60 by a hinge 180 and the latch assembly 168. It will be understood that the arrangement of the latch assembly 168 and the hinge 180 is exemplary only and that the latch assembly 168 and the hinge 180 may be arranged in alternate configurations without departing from the scope of the present disclosure. Each hinge 180 includes a hinge base 184 fixedly coupled to the rail slide 60. The hinge 180 further includes a hinge arm 188 pivotally coupled to the second horizontal support 98 and further pivotally coupled to the hinge base 184.

Figure 4:
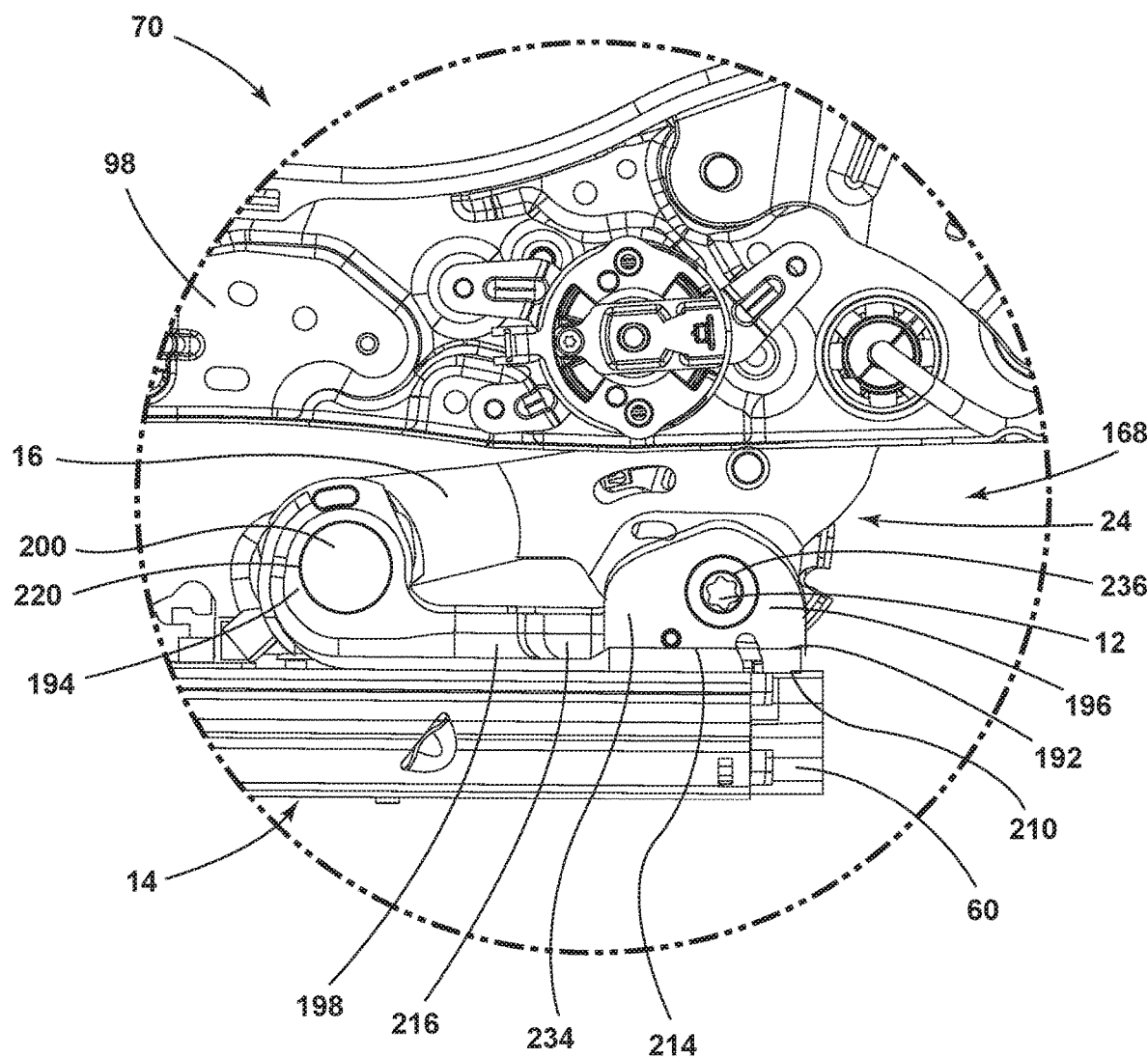
FIG. 4 is an enlarged view of section IV of FIG. 3B.
Figure 5:
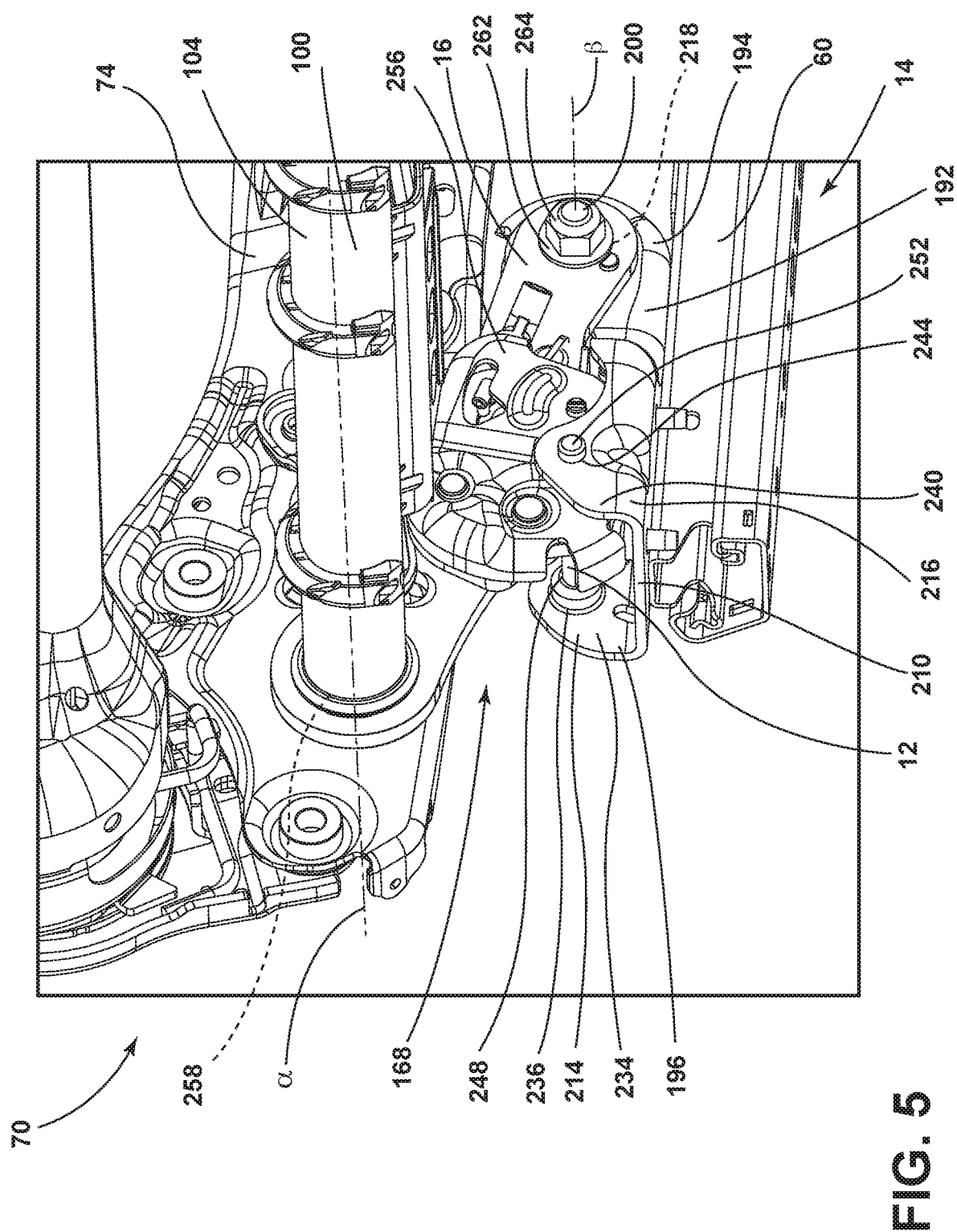
FIG. 5 is an enlarged side elevational view of a base of a frame of a vehicle seating assembly showing a latch of the vehicle seating assembly in a design position.

Referring now to FIGS. 4 and 5, each latch assembly 168 includes a striker plate 192 secured on the rail slide 60. The striker plate 192 includes an elongated member 198 with a first end 194 and second end 196. The first end 194 is operably coupled to the sector arm 16 by a pivot pin 200. As shown in FIG. 5, the sector arm 16 may be further operably coupled to the torsion bar 100 acting as the rear portion 104 of the base frame 74. The sector arm 16 defines a first pivot axis α and a second pivot axis β. The first pivot axis α aligns with the center of the torsion bar 100 while the second pivot axis β aligns with the pivot pin 200 operably coupled to the first end 194 of the striker plate 192.

Still referring to FIGS. 4 and 5, the striker plate 192 includes a base 210, a first plate side 214, and a second plate side 216. The base 210 is integrally formed with and joins the first and second plate sides 214, 216. As shown in FIG. 4, the first plate side 214 includes a first upturned flange 234. The first upturned flange 234 defines a first striker aperture 236 configured to receive the striker pin 12. It will be understood that the configuration of the striker pin 12 and a plate pivot aperture 220 are exemplary only and that the location of the plate pivot aperture 220 and the striker pin 12 may be adjusted without departing from the scope of the present disclosure.

The second plate side 216 may be non-linear and extends the length of the elongated member 198 of the striker plate 192. At the first end 194, the second plate side 216 defines the plate pivot aperture 220 configured to receive the pivot pin 200. The pivot pin 200 operably couples the first end 194 to the sector arm 16. At the second end 196, the second plate side 216 may include a second upturned flange 240. The second upturned flange 240 defines a second striker aperture 244. The first striker aperture 236 receives a first end 248 of the striker pin 12, and the second striker aperture 244 receives a second end 252 of the striker pin 12. The first plate side 214 and the second plate side 216 are spaced apart a predetermined distance to allow the striker plate 192 to receive the dual cam latch 24 disposed on the sector arm 16, including a latch housing 256. The dual cam latch 24 is releasably coupled to the striker pin 12 between the first end 248 and the second end 252 of the striker pin 12.

Still referring to FIG. 5, the sector arm 16 defines a first pivot aperture 258 configured to receive the torsion bar 100 of the rear portion 104 of the base frame 74 and a second pivot aperture 218 configured to align with the plate pivot aperture 220 and receive the pivot pin 200. As discussed elsewhere herein, the first end 194 of the striker plate 192 and the sector arm 16 are operably coupled by the pivot pin 200 extending through the plate pivot aperture 220 and the second pivot aperture 218 of the sector arm 16. The pivot pin 200 may be secured by a washer 262 and a nut 264.

However, it is contemplated that other methods of coupling the striker plate 192 and the sector arm 16 may also be implemented.

Figure 6:
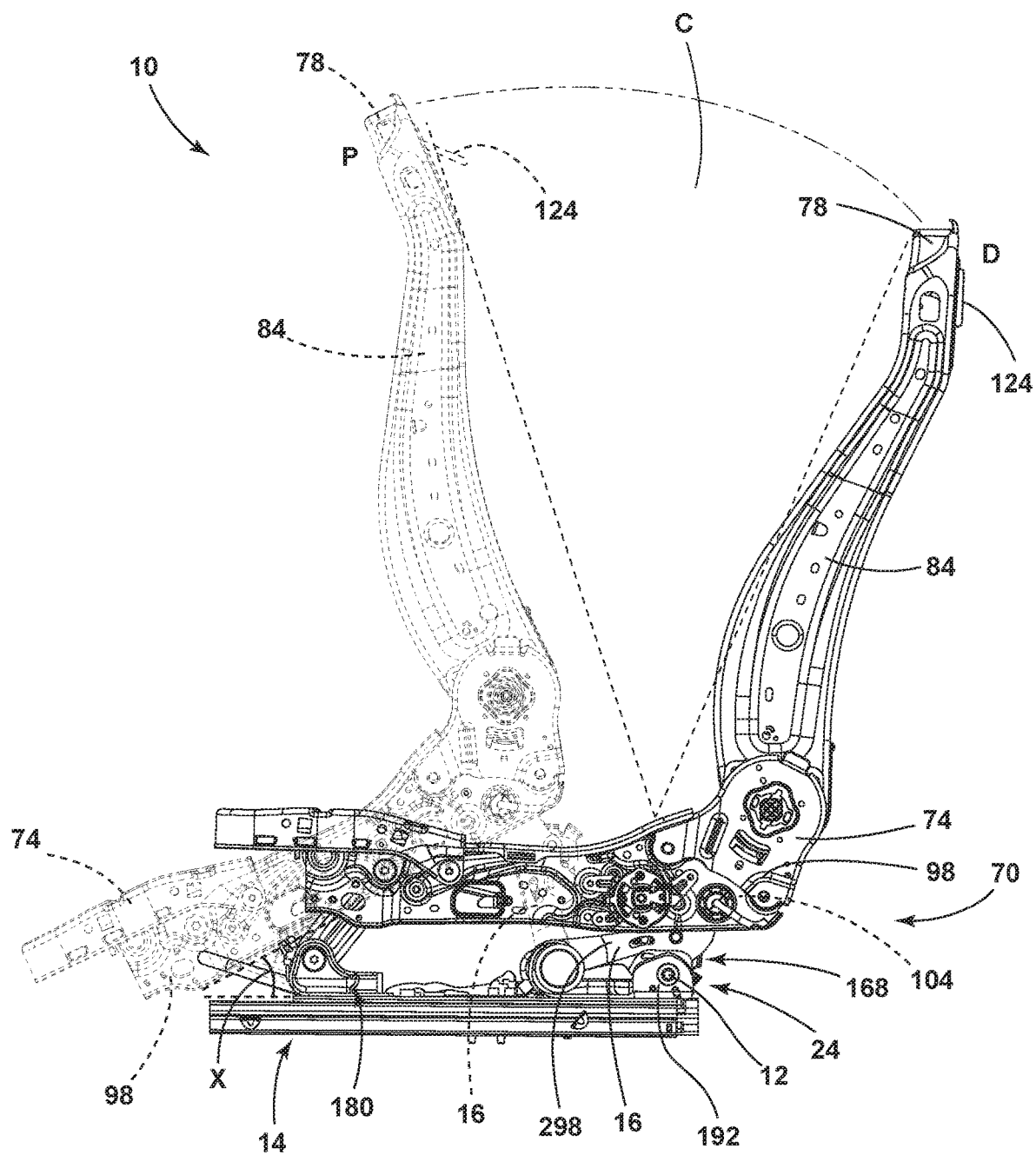
FIG. 6 is a side elevational view of a frame of a seating assembly with a two-way pitching mechanism in a design position and showing a pitched position in phantom.

Referring now to FIG. 6, each hinge 180 and each latch assembly 168 are configured to pivot from the design position D to the pitched position P. In the illustrated embodiment, each sector arm 16 of the latch assembly 168 is a single elongated member 298. However, it is contemplated that each sector arm 16 may be a single plate or a plurality of plates forming the sector arm 16. As discussed elsewhere herein, the sector arm 16 is operably coupled to the rear portion 104 of the base frame 74 in the illustrated embodiment. However, it is contemplated that the sector arm 16 may be operably coupled to any portion of the base frame 74 of the seating assembly 10. The sector arm 16 is further operably coupled to the striker plate 192. As shown in FIGS. 4-6, when the seating assembly 10 is in the design position D, the dual cam latch 24 of the latch assembly 168 is engaged with the striker pin 12 and the sector arm 16 of the latch assembly 168 sits substantially flush with the striker plate 192. As shown in FIG. 6, when the seating assembly 10 is in the pitched position P, the sector arm 16 is extended upward to support the rear portion 104 of the base frame 74. The base frame 74 is inclined forward, forming an acute angle X between the base frame 74 and the track assembly 14. By pitching the base frame 74 forward and supporting the base frame 74 at an incline, the two-way pitching mechanism 70 creates a cone of entry C that gives sufficient space to allow a user to enter behind the seating assembly 10.

Figure 7A:
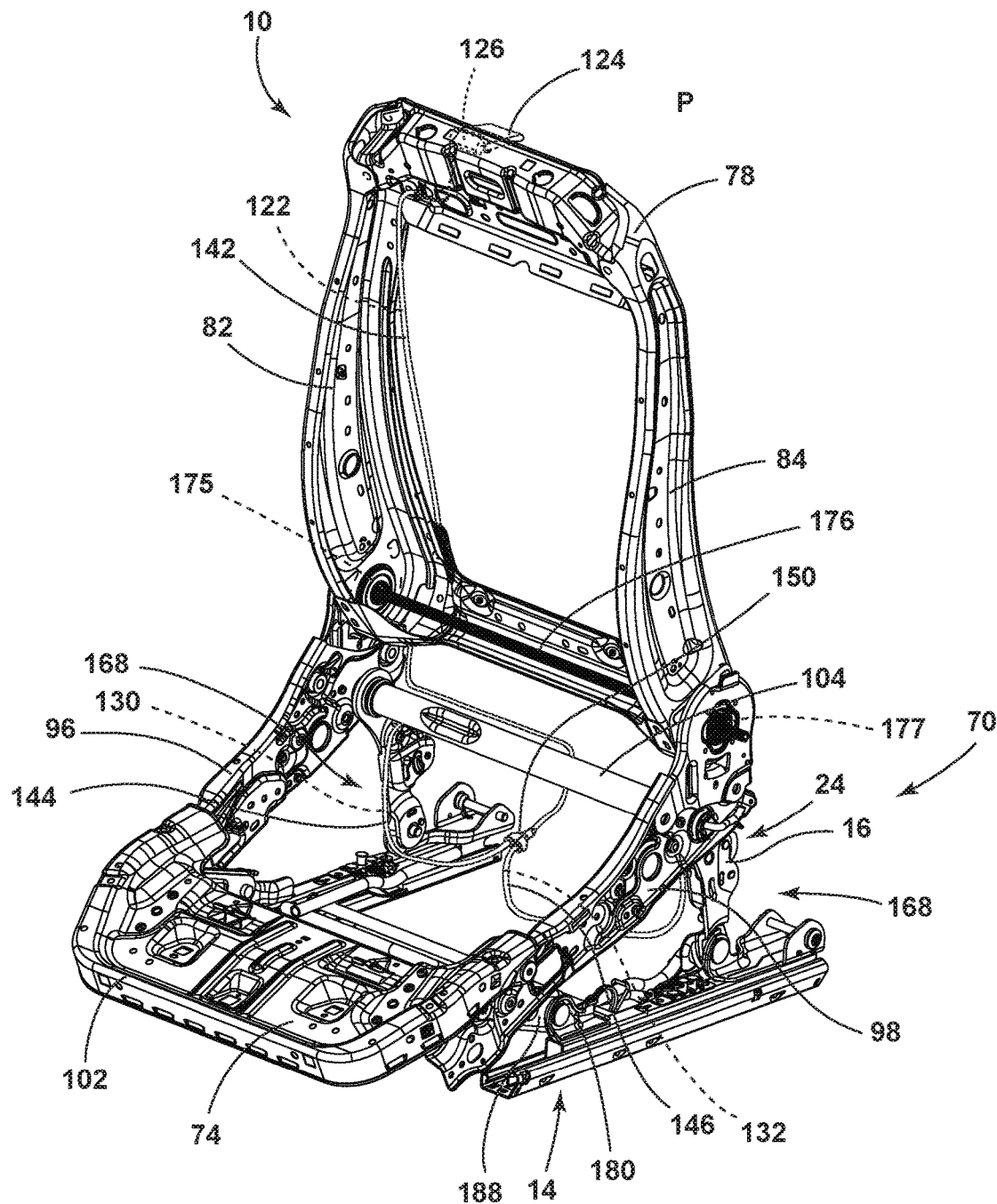
FIG. 7A is a top perspective view of a frame with a two-way pitching mechanism in a pitched position.

Referring now to FIG. 7A, the first cable 122 is operably coupled to the actuator 124, as described elsewhere herein. When actuated, the actuator 124 applies tension to the first cable 122. The first cable 122 subsequently transfers the tension from the actuator 124 to the first and second latch cables 130, 132 by way of the standard splitter 150. When the tension is transferred to the first and second latch cables 130, 132, each latch assembly 168 is released, allowing each sector arm 16 to extend upward into a raised position.

Referring now to FIGS. 7A-9, when the sector arm 16 is in the raised position, as noted elsewhere herein, the sector arm 16 extends substantially vertically. The sector arm 16 lifts the rear portion 104 of the base frame 74, inclining the base frame 74 forward. As shown in FIG. 7B, the hinge arm 188 of the hinge 180 rotates forward with the front portion 102 of the base frame 74 when each latch assembly 168 is released and rotates into the pitched position P. The hinge arm 188 supports the front portion 102 of the base frame 74 when the seating assembly 10 is in the pitched position P.

Figure 8:
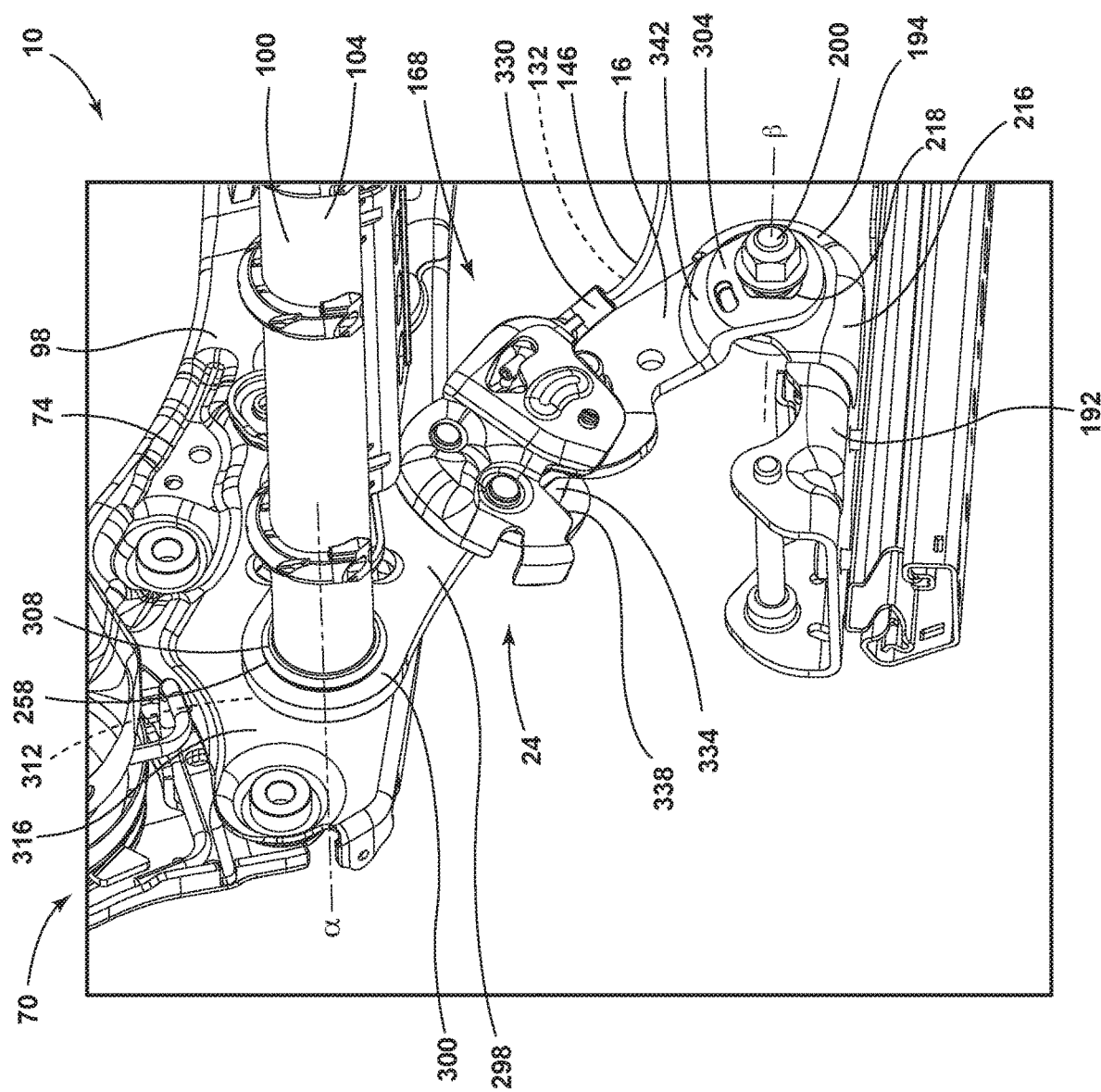
FIG. 8 is an enlarged inside perspective view of the base including the latch of FIG. 5 in an intermediate position.
Figure 9:
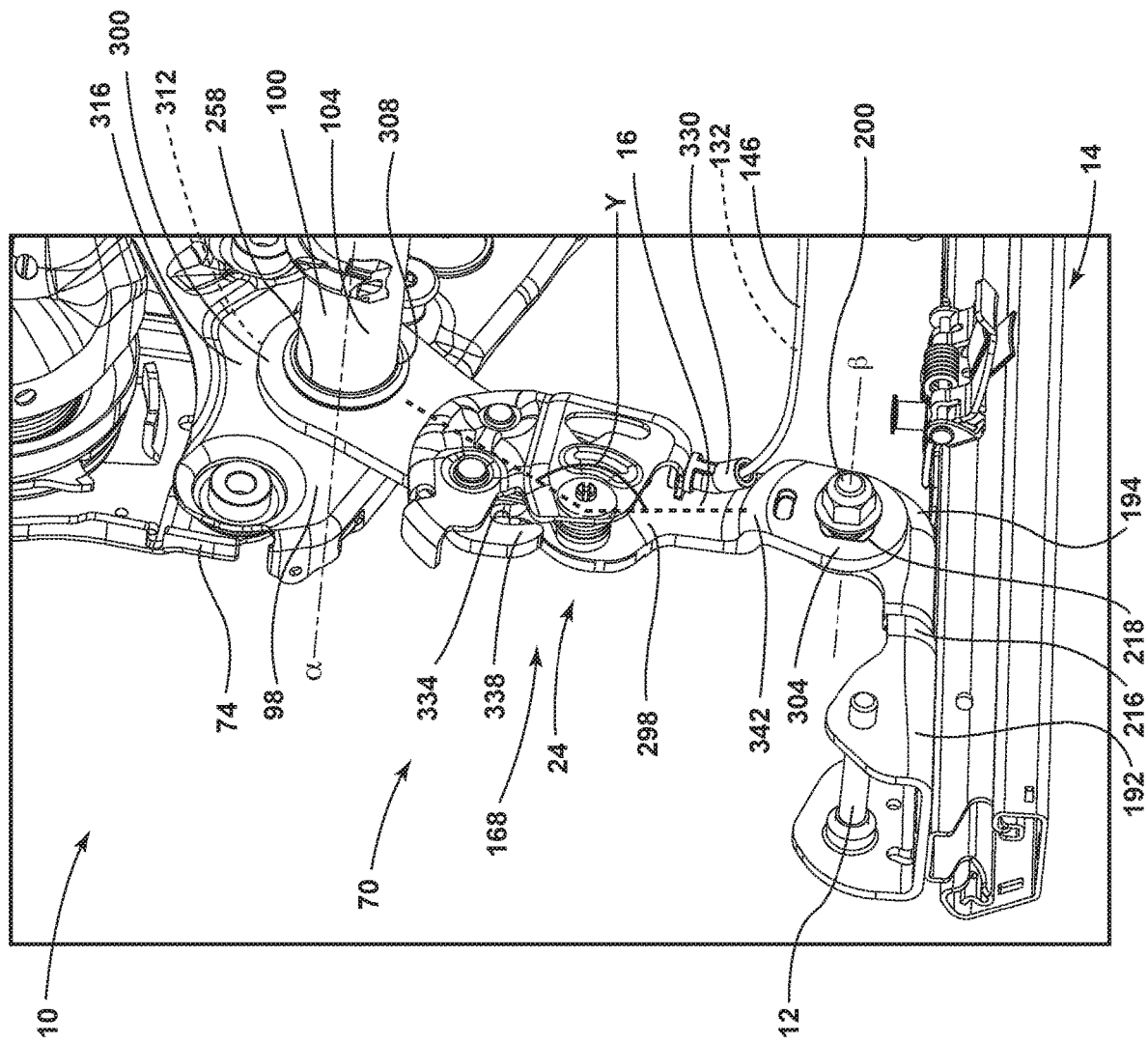
FIG. 9 is an enlarged inside perspective view of the base including the latch of FIG. 5 in a pitched position.

Referring now to FIGS. 8 and 9, the latch assembly 168 includes the sector arm 16 and the dual cam latch 24. The sector arm 16 includes the elongated member 298 and is rotatable between a lowered position (FIG. 6) and the raised position (FIG. 9). The member 298 includes a first end 300 and a second end 304. The first end 300 defines the first pivot aperture 258. The first pivot axis $\alpha$ is defined by the first end 300 and is aligned to extend through the center of the first pivot aperture 258. In the illustrated embodiment, the first pivot aperture 258 is configured to receive the torsion bar 100, as discussed elsewhere herein. The sector arm 16 may be secured on the torsion bar 100 by a washer 308 and may be disposed so that a first surface 312 of the sector arm 16 is substantially flush against an interior surface 316 of the second horizontal support 98 (FIGS. 8 and 9). The second end 304 of the sector arm 16 defines the second pivot aperture 218 which is configured to receive the pivot pin 200. In the illustrated embodiment, the pivot pin 200 operably couples the sector arm 16 to the striker plate 192. The second end 304 of the sector arm 16 further defines the second pivot axis $\beta$ extending through the center of the second pivot aperture 218 and aligned with the pivot pin 200. As shown in FIGS. 6, 8, and 9, the first pivot axis $\alpha$ allows the sector arm 16 to rotate about the torsion bar 100 of the base frame 74 when the seating assembly 10 is lifted by the sector arm 16. The second pivot axis $\beta$ allows the sector arm 16 to rotate between the raised position and the lowered position as the latch assembly 168 is actuated.

Figure 10A:
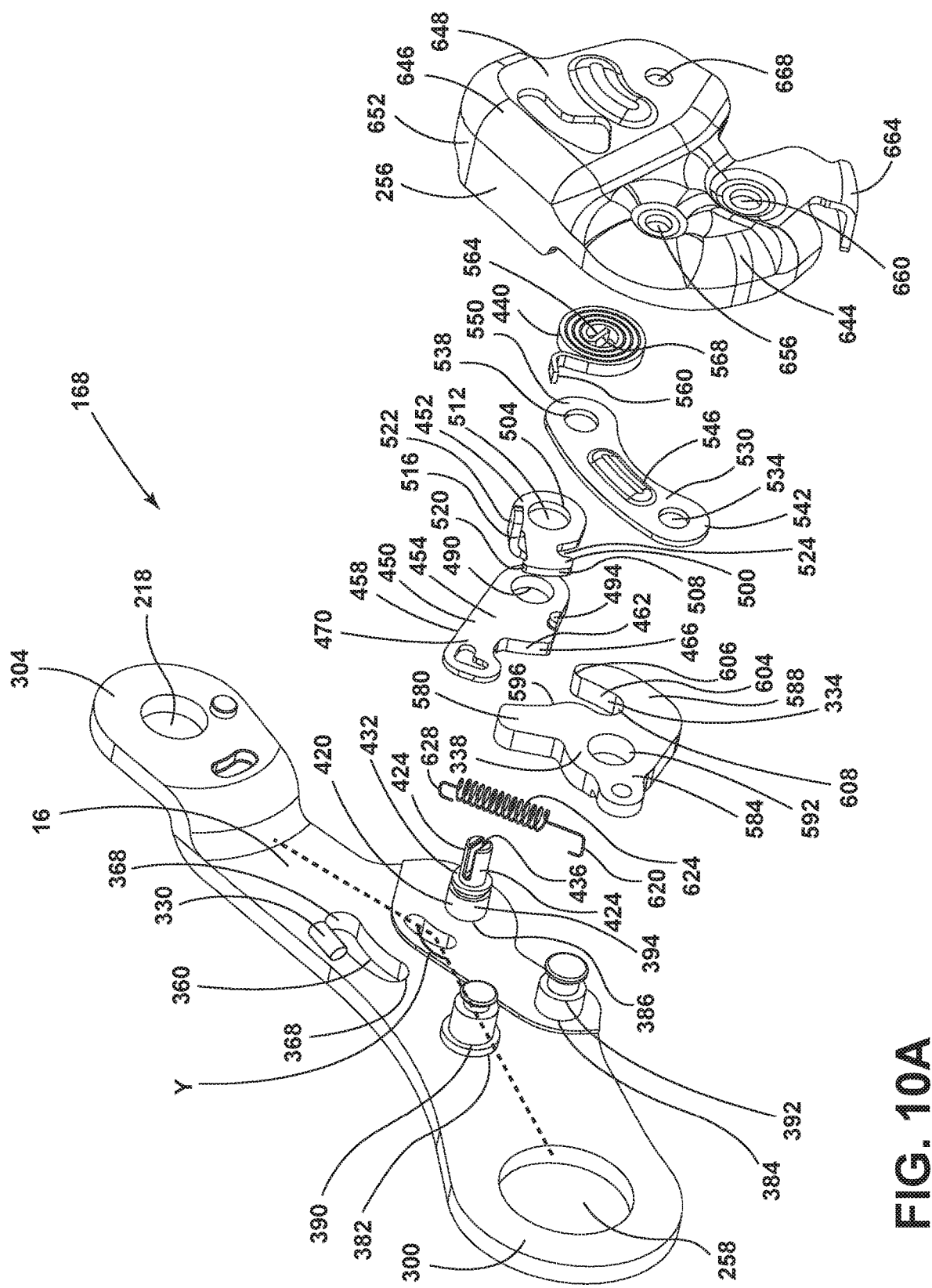
FIG. 10A is a side elevational view of a latch assembly for use with a two-way pitching mechanism or a four-way pitching mechanism of the present disclosure.

Still referring to FIGS. 8 and 9, the elongated member 298 of the sector arm 16 forms an obtuse angle Y (FIGS. 9 and 10A). The dual cam latch 24 is disposed proximate to the middle of the sector arm 16 where angle Y is formed. The second pivot aperture 218 is defined by the second end 304 of the member 298 so that the second pivot axis $\beta$ is a first distance from an opening 334 defined by the locking hook 338 of the dual cam latch 24. The first distance is equivalent to a second distance, and the second distance is measured from the second pivot axis $\beta$ to the striker pin 12. When the sector arm 16 is in the down position, the striker pin 12 is received by the opening 334, defined by the locking hook 338 of the latch assembly 168. The obtuse angle Y of the sector arm 16 allows both the base frame 74 and a section of the sector arm 16 to be substantially parallel with the track assembly 14 when the sector arm 16 is in the lowered position. The elongated member 298 of the sector arm 16 may include an offset 342 proximate to the second end 304. The offset 342 is configured to allow the sector arm 16 to couple with the striker plate 192, as discussed elsewhere herein. The offset 342 is configured to receive the first plate side 214 at the first end 194 of the striker plate 192. The offset 342 is non-linear to allow the first plate side 214 to be received by the offset 342 for the full range of movement of the sector arm 16 as it rotates about the second pivot axis $\beta$.

Still referring to FIGS. 8 and 9, a latch cable guide 330 is disposed proximate the latch housing 256. The latch cable guide 330 is configured to receive one of the first and second latch cables 132. The second latch cable 132 extends through the latch cable guide 330 to operably couple to the dual cam latch 24 of the latch assembly 168, as discussed elsewhere herein. The third cable sleeve 146 may encase the second latch cable 132. It will be understood that the configuration shown is only one side of the seating assembly 10 and the configuration of the other side, though not shown, mirrors the side shown.

Figure 10B:
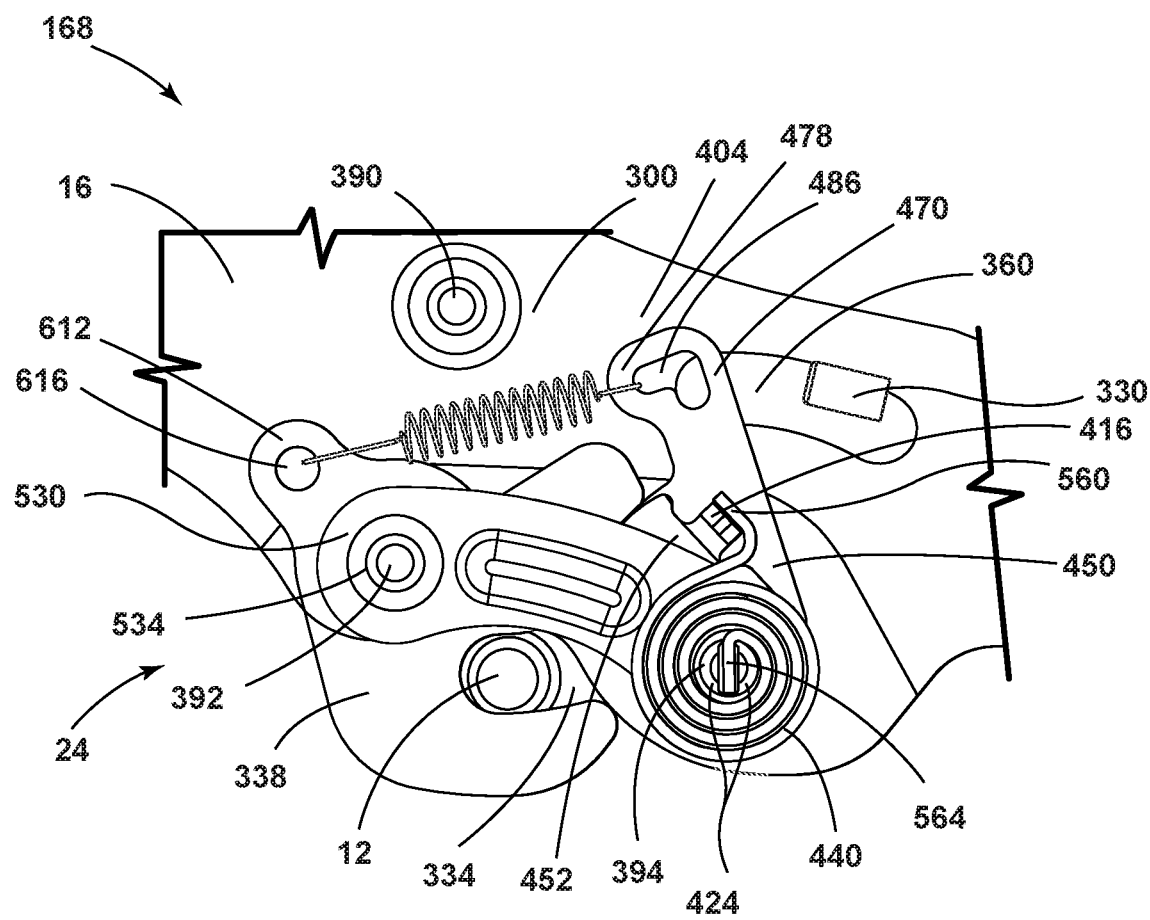
FIG. 10B is an exploded top perspective view of the latch assembly of FIG. 10A.

Referring now to FIGS. 10A and 10B, the member 298 of the sector arm 16 defines an elongated opening 360 proximate the top of the member 298 so that the elongated opening 360 may be configured to guide movement of the dual cam latch 24. The elongated opening 360 may be arched with rounded ends 368. The elongated opening 360 is also proximate the latch cable guide 330. The member 298 further defines a first connection opening 382, a second connection opening 384, and a third connection opening 386 configured to receive first, second, and third connection pins 390, 392, 394, respectively, for connecting the other components of the dual cam latch 24 to the sector arm 16. The first connection opening 382 is defined between the elongated opening 360 and the first pivot aperture 258. As shown in FIG. 10A, the first connection pin 390 is received by the first connection opening 382 and extends outward a predetermined distance. The second connection opening 384 is defined by the sector arm 16 proximate to the first connection opening 382 and is configured to receive the second connection pin 392. The second connection pin 392 has a similar configuration to the first connection pin 390. It will be understood that the configuration of the first connection opening 382 and the second connection opening 384 is exemplary only, and the configuration may be adjusted without departing from the scope of the present disclosure.

Referring again to FIGS. 10A and 10B, the third connection opening 386 is defined by a downward extending flange 416 of the sector arm 16. The third connection opening 386 is configured to receive the third connection pin 394. The third connection pin 394 is of an arbor and pivot design. The third connection pin 394 includes a body portion 420 with a pair of protrusions 424 extending from an end of the body portion 420. The pair of protrusions 424 is disposed so that the protrusions 424 are parallel to each other and form a generally cylindrical arm 432. The arm 432 is of a smaller diameter than the body portion 420 and is configured to be received by various apertures defined by other components of the dual cam latch 24. The protrusions 424 define a slot 436 extending a predetermined distance through the center of the arm 432 and configured to receive a cinching spring 440. The slot 436 acts as the arbor for the arbor design pin or third connection pin 394.

Referring still to FIGS. 10A and 10B, the dual cam latch 24 includes the locking hook 338 operably coupled to a structural cam 450 and an adjustment cam 452. Referring now to FIG. 10B, the structural cam 450 includes a flange 470. The flange 470 extends upward from the structural cam 450 and is configured to receive the second latch cable 132 (not shown) from the latch cable guide 330. The structural cam 450 also includes a first face 454 and a continuous edge 458. The edge 458 defines a shelf 462. The shelf 462 and a curved protrusion 478 extending laterally from the side of a flange 470 define a space 466. The space is configured to receive the locking hook 338. The flange 470 defines an L-shaped opening 486 where the opening 486 is also defined by the curved protrusion 478. The structural cam 450 further defines an aperture 490 to receive the third connection pin 394. A tab 494 is disposed proximate the aperture 490 and extends perpendicularly to the first face 454 of the structural cam 450. In the illustrated embodiment, the tab 494 is generally semi-cylindrical. However, it is contemplated that a tab of any shape may be used without departing from the scope of the present disclosure.

Referring again to FIGS. 10A and 10B, an adjustment cam 452 is disposed substantially flush to the first face 454 of the structural cam 450. Referring again to FIG. 10A, the adjustment cam 452 includes a first end 500 and a second end 504. The first end 500 includes a top edge 508 configured to generally align with and extend upward past the shelf 462 of the structural cam 450. The second end 504 of the adjustment cam 452 is non-linear and defines an aperture 512 configured to align with the aperture 490 of the structural cam 450. The aperture 512 is configured to receive the third connection pin 394 to secure the adjustment cam 452 to the structural cam 450 and the sector arm 16. A foot 516 extends laterally from an edge 520 of the adjustment cam 452. The foot 516 is angled to provide a top surface 522 perpendicular to the adjustment cam 452 and aligned with the edge 520. The adjustment cam 452 further defines a notch 524 configured to receive the tab 494 of the structural cam 450. The notch 524 is configured to partially receive the tab 494 when the structural cam 450 is in a neutral position. The notch 524 is further configured to fully receive the tab 494 when the structural cam 450 engages with the adjustment cam 452. It will be understood that the notch 524 may be any shape or configuration designed to fully receive the tab 494 when the structural cam 450 engages with the adjustment cam 452.

Referring again to FIGS. 10A and 10B, a doubler plate 530 may separate the structural cam 450 from the adjustment cam 452. A first plate aperture 534 is defined by a first end 542 of the doubler plate 530 and is configured to receive the second connection pin 392. A body portion 546 of the doubler plate 530 may be curved and connects the first end 542 to a second end 550. A second plate aperture 538 is defined by the second end 550 and is configured to align with the aperture 490 of the structural cam 450 and the aperture 512 of the adjustment cam 452. The second plate aperture 538 receives the third connection pin 394 so that the third connection pin 394 extends through the second plate aperture 538 to allow further coupling to the cinching spring 440. It is contemplated that the dual cam latch 24 may be configured to exclude the doubler plate 530, in some embodiments, without departing from the scope of the present disclosure.

Referring again to FIGS. 10A and 10B, the cinching spring 440 is generally circular and is operably coupled to the structural cam 450 and the adjustment cam 452 by the third connection pin 394. A first extension 560 extends tangent to the cinching spring 440. When the cinching spring 440 is in place within the dual cam latch 24 of the latch assembly 168, as shown in FIG. 10A, the first extension 560 is substantially flush with the top surface 522 of the foot 516 of the adjustment cam 452. A second extension 564 bisects an opening 568 defined by the cinching spring 440. The second extension 564 is received by the slot 436 of the third connection pin 394 until the second extension 564 is secured within the slot 436. When the cinching spring 440 is engaged with the slot 436 of the third connection pin 394 and the foot 516 of the adjustment cam 452, the cinching spring 440 biases the adjustment cam 452 into a blocked position.

Referring still to FIGS. 10A and 10B, the locking hook 338 is operably coupled to the sector arm 16 by the second connection pin 392. As shown in FIG. 10A, the locking hook 338 includes a first flange 580, a body portion 584, and a second flange 588. The body portion 584 is generally circular and defines an aperture 592 configured to receive the second connection pin 392. The first flange 580 extends tangent to the body portion 584 and includes a side edge 596. The first flange 580 further includes a first surface 608 defining the top of the opening 334. The second flange 588 curves out and away from the body portion 584 to define the bottom of the opening 334 configured to receive the striker pin 12. The second flange 588 includes a second surface 604 defining the opening 334 and further includes an end 606. When the striker pin 12 is received by the opening 334, the striker pin 12 is positioned between the second surface 604 and the first surface 608. A protrusion 612 also extends from the body portion 584 to define an attachment aperture 616. The attachment aperture 616 is configured to receive a first end hook 620 of a return spring 624. The return spring 624 is a tension spring configured to operably couple the locking hook 338 to the structural cam 450. The return spring 624 includes a second end hook 628 configured to be received by the L-shaped opening 486 of the structural cam 450. The return spring 624 allows force to be transferred from the structural cam 450 to the locking hook 338 so that a predetermined force can release the locking hook 338.

Referring still to FIG. 10A, the dual cam latch 24 may be enclosed in the latch housing 256. In the illustrated embodiment, the latch housing 256 includes a first portion 644 and a second portion 646. The latch housing 256 further includes an outer surface 648 and a housing edge 652 integrally formed with the outer surface 648. The first portion 644 defines a first housing aperture 656 and a second housing aperture 660 configured to receive the first connection pin 390 and the second connection pin 392 to secure the latch housing 256 over the dual cam latch 24, respectively. The first portion 644 is configured to encase the locking hook 338 and may be non-linear to allow the locking hook 338 to rotate between a locked position and an unlocked position without abutting the housing edge 652. The first portion 644 may also include an arm 664 extending perpendicularly to the outer surface 648 of the latch housing 256 and parallel to the housing edge 652. The arm 664 may be configured to guide the locking hook 338 as the locking hook 338 rotates between the locked position and the unlocked position. The second portion 646 defines a third housing aperture 668 configured to receive the third connection pin 394. The second portion 646 is further configured to secure over the structural cam 450, the adjustment cam 452, and the cinching spring 440. It will be understood that the latch housing 256 of the illustrated embodiment is exemplary only, and it is contemplated that a housing of a different shape or no housing at all may be used.

Figure 11A:
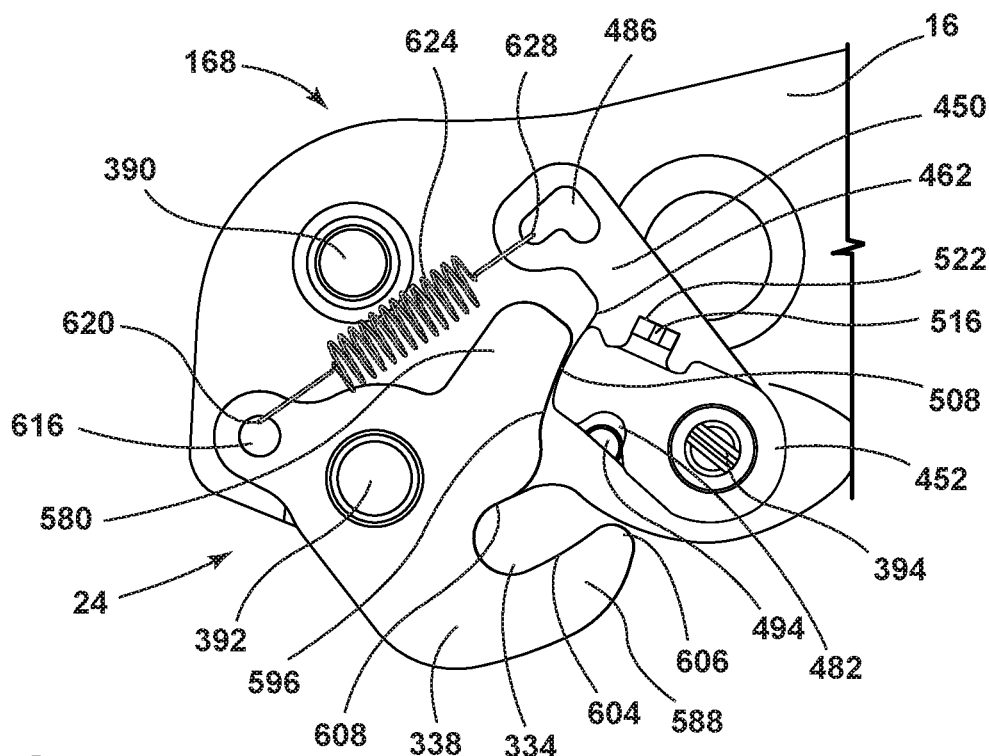
FIG. 11A is a side elevational view of a dual cam mechanism of the latch assembly of FIG. 10A in a first position.
Figure 11B:
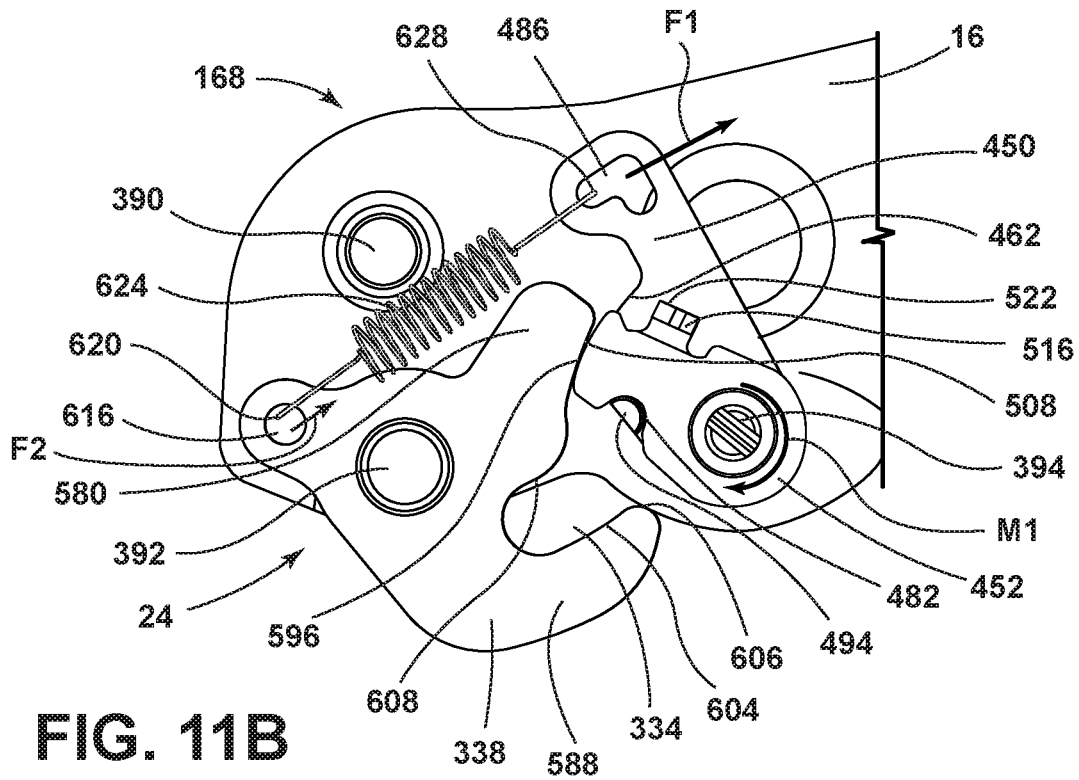
FIG. 11B is a side elevational view of the dual cam mechanism of FIG. 11A in a second position.
Figure 11C:
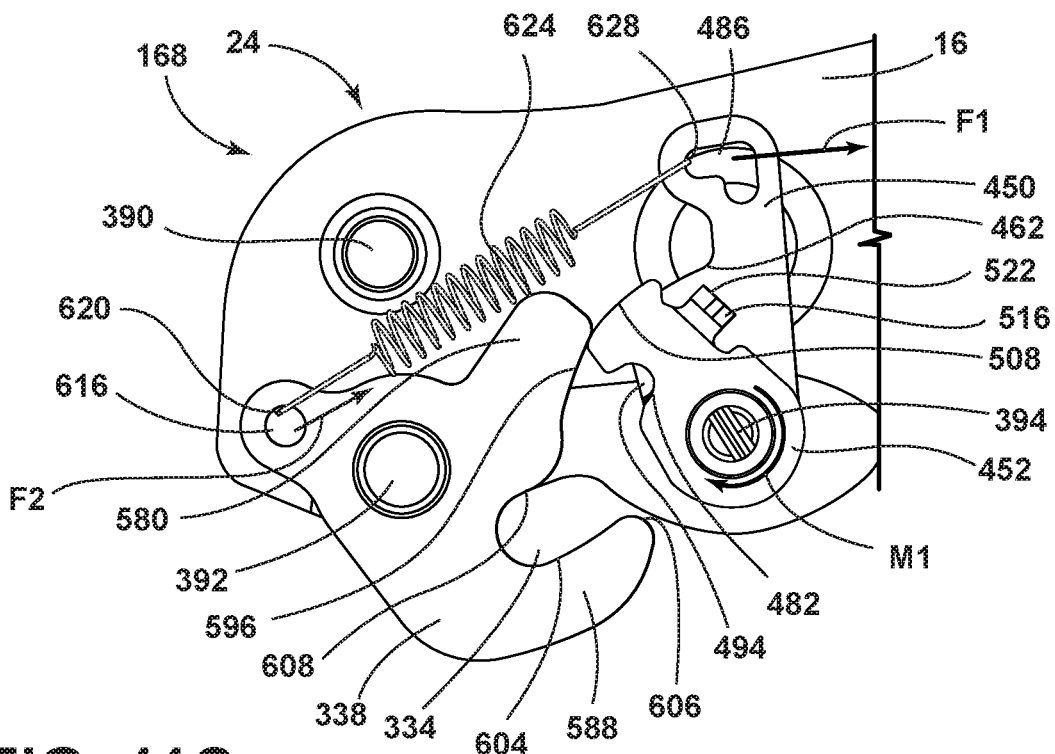
FIG. 11C is a side elevational view of the dual cam mechanism of FIG. 11A in a third position.
Figure 11D:
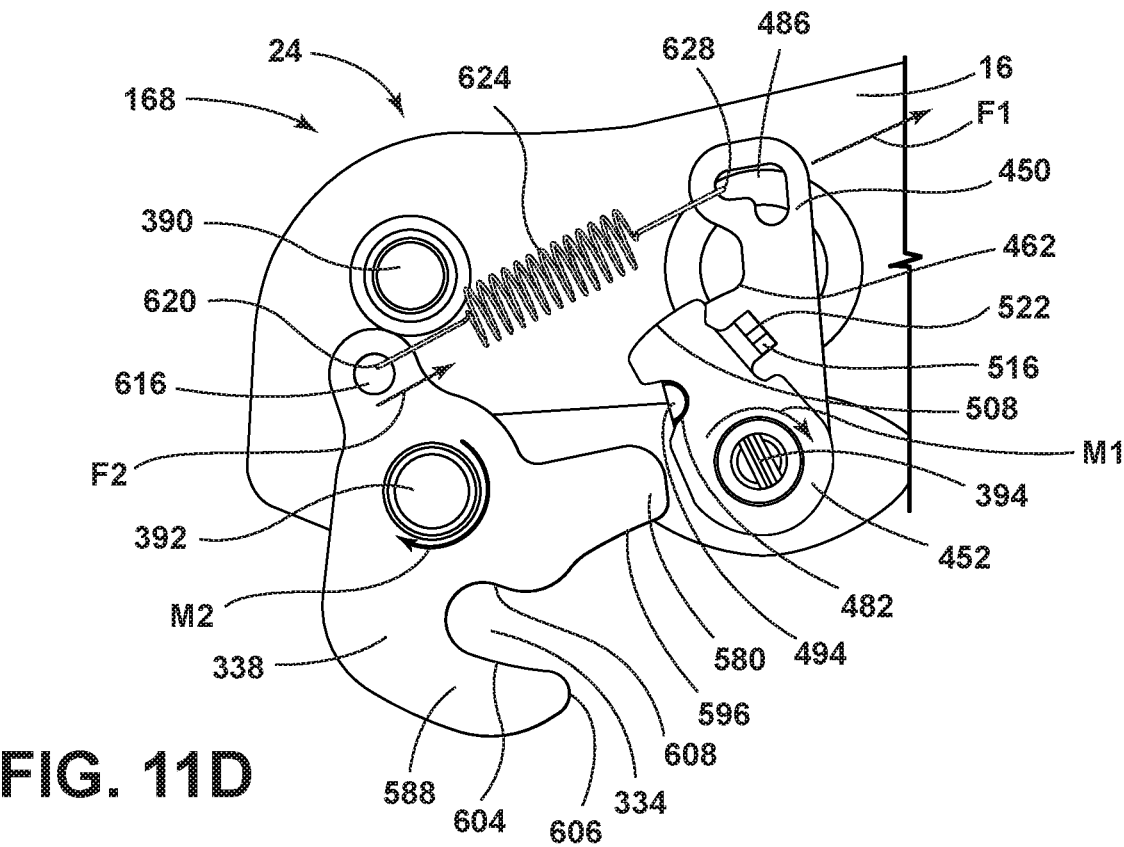
FIG. 11D is a side elevational view of the dual cam mechanism of FIG. 11A in a fourth position.

Referring now to FIGS. 11A-11D, the latch assembly 168 is shown with the first and second connection pins 390, 392, the locking hook 338, the structural cam 450, the adjustment cam 452, and the return spring 624. As shown in the illustrated embodiments, the locking hook 338 is rotatable between the locked position (FIGS. 11A-11C) and the unlocked position (FIG. 11D). Similarly, the structural cam 450 and the adjustment cam 452 are operable between a blocked position and a removed position. The blocked position of the structural cam 450 and the adjustment cam 452 corresponds to the locked position of the locking hook 338. Similarly, the removed position of the structural cam 450 and the adjustment cam 452 corresponds to the unlocked position of the locking hook 338.

Referring now to FIG. 11A, the locking hook 338 is shown in the locked position. In the illustrated embodiment, the side edge 596 of the first flange 580 of the locking hook 338 is substantially flush with the top edge 508 of the adjustment cam 452. The tab 494 of the adjustment cam 452 is not fully engaged with the notch 524 of the structural cam 450, and the return spring 624 is in a neutral position. When the locking hook 338 is in the locked position, the second flange 588 is positioned to prevent the striker pin 12 from being removed from the opening 334. To secure the striker pin 12, the end 606 of the locking hook 338 is aligned with the downward extending flange 416 of the sector arm 16. The top edge 508 of the adjustment cam 452 abutting the side edge 596 of the first flange 580 of the locking hook 338 prevents the locking hook 338 from rotating out of the locked position. The locking hook 338 will remain in the locked position until acted upon by a force that also rotates the adjustment cam 452 and the structural cam 450 out of the blocked position.

Referring now to FIG. 11B, when the latch assembly 168 is actuated by the first or second latch cable 130, 132, a force F1 is applied to the structural cam 450 by the first or second latch cable 130, 132. The force F1 applies tension on the return spring 624, resulting in a force F2 being exerted on the locking hook 338 through the return spring 624. The side edge 596 of the first flange 580 of the locking hook 338 remains in contact with the adjustment cam 452. When the force F1 is applied to the structural cam 450, the structural cam 450 rotates about the third connection pin 394 until the tab 494 fully engages with the notch 524 of the adjustment cam 452. When the tab 494 fully engages with the notch 524, a moment M1 is applied to the adjustment cam 452 and cinching spring 440 (not shown). The moment M1 is applied generally clockwise about the third connection pin 394 as the tab 494 remains fully engaged with the notch 524 and the foot 516 of the adjustment cam 452 begins to move in a clockwise direction.

Referring now to FIGS. 11C and 11D, the first or second latch cable 130, 132 continues to apply the force F1 to the structural cam 450. The structural cam 450 continues to move in a generally rearward direction, applying the moment M1 to the adjustment cam 452. As the adjustment cam 452 rotates, the top edge 508 of the adjustment cam 452 is gradually moved out of contact with the side edge 596 of the locking hook 338. When the top edge 508 of the adjustment cam 452 is removed from contact with the side edge 596, the locking hook 338 is free to rotate about the second connection pin 392. The structural cam 450 continues applying tension to the return spring 624, continuing to apply the force F2 on the locking hook 338. As the force F2 on the locking hook 338 increases, a moment M2 is applied generally clockwise about the second connection pin 392, rotating the locking hook 338 into the unlocked position, as shown in FIG. 11D. The locking hook 338 will remain in the unlocked position until it receives the striker pin 12. When the striker pin 12 is received by the opening 334 defined by the locking hook 338, the striker pin 12 pushes the first flange 580 upwards when it contacts the side edge 596 of the first flange 580. When the locking hook 338 reaches the locked position, the cinching spring 440 rotates the adjustment cam 452 back into the blocked position, allowing the side edge 596 to contact the top edge 508 of the adjustment cam 452 and securing the locking back into the locked position.

Referring now to FIGS. 11A-11D, the structural cam 450 and the adjustment cam 452 are disposed to allow the locking hook 338 to contact only the adjustment cam 452. The structural cam 450 includes the shelf 462 that is disposed below the top edge 508 of the adjustment cam 452. In the event of a collision event, the adjustment cam 452 may be crushed or deformed by the pressure from the side edge 596 of the locking hook 338. If the adjustment cam 452 fails, the shelf 462 of the structural cam 450 is configured to support the side edge 596 of the locking hook 338, holding the locking hook 338 in the locked position.

Figure 12A:
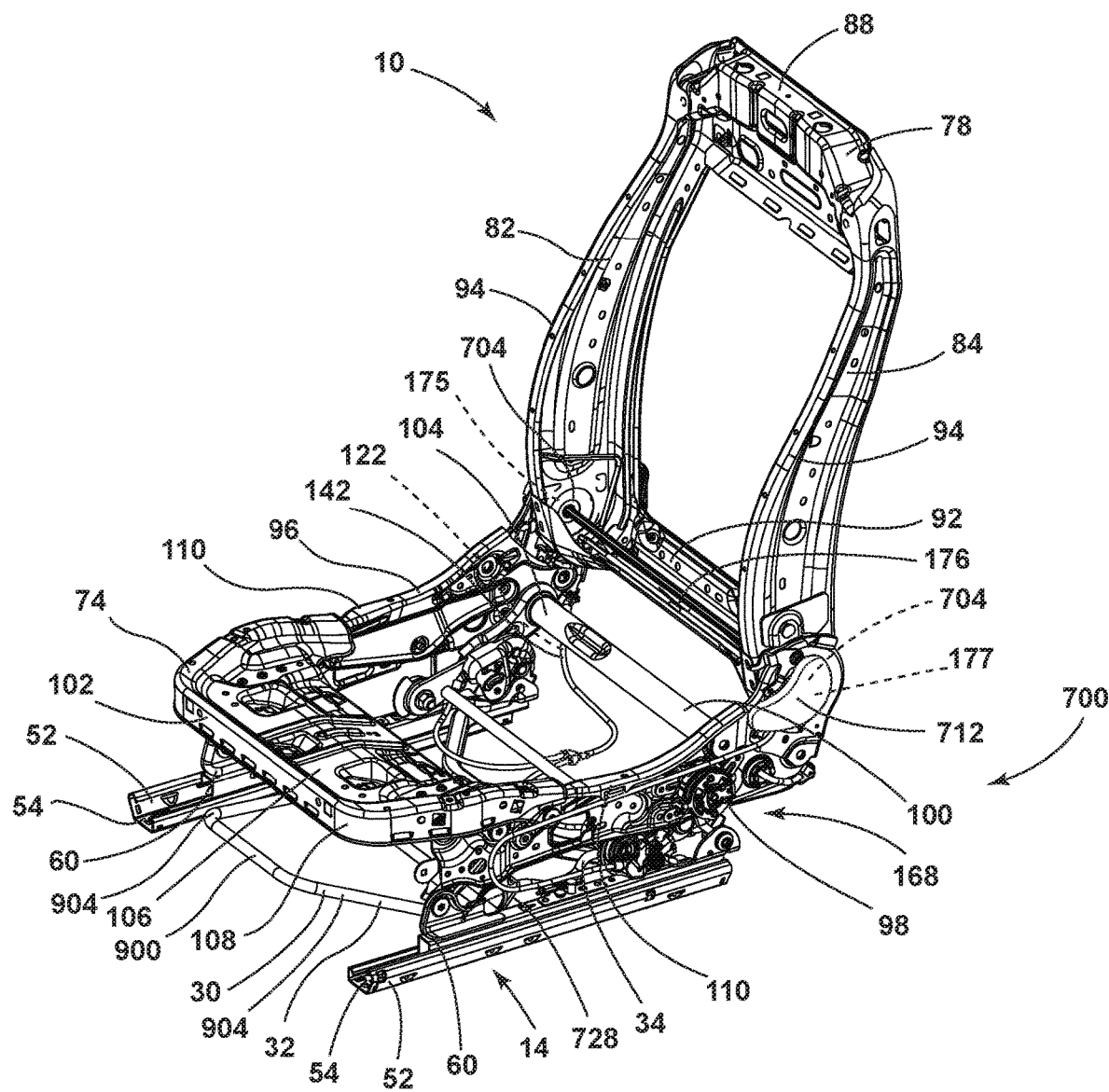
FIG. 12A is a top perspective view of a frame of a vehicle seating assembly with a four-way pitching mechanism in a design position.

Referring now to FIG. 12A, the seating assembly 10 is shown with a four-way pitching mechanism 700. The seating assembly 10 is similar to the seating assembly 10 described in FIGS. 3A and 3B. Where components are substantially the same, the same reference numerals have been used. As previously described in FIG. 3A, the seating assembly 10 includes the base frame 74 and the back frame 78. The base frame 74 includes the first horizontal support 96 and the second horizontal support 98 operably coupled by the front portion 102 and the rear portion 104. The back frame 78 includes the first vertical support 82 and the second vertical support 84 operably coupled by the top portion 88 and the bottom portion 92. The base frame 74 and the back frame 78 are operably coupled by the transverse connector 176 extending from the first recliner heart 175 to the second recliner heart 177. It will be understood that the general configuration of the base frame 74 and the back frame 78 are similar to the base frame 74 and the back frame 78 described elsewhere herein, more specifically in FIG. 3A.

Referring still to FIG. 12A, the first and second vertical supports 82, 84 are operably coupled to the first and second horizontal supports 96, 98 by pivots 704. The pivots 704 may be configured to receive first and second recliner hearts 175, 177 and the transverse connector 176 connecting the first and second recliner hearts 175, 177. The first and second recliner hearts 175, 177 and the transverse connector 176 allow the first and second vertical support 82, 84 of the back frame 78 to incline forward simultaneously when actuated. In the illustrated embodiment, an actuator 712 is operably coupled to one of the pivots 704 of the second horizontal support 98. It is contemplated that the actuator 712 may be disposed on any one of the first and second horizontal supports 96, 98 of the seating assembly 10. Alternatively, it will be understood that the actuator 712 may be disposed on the back frame 78 or in any other position proximate to the seating assembly 10 without departing from the scope of the present disclosure.

Figure 12B:
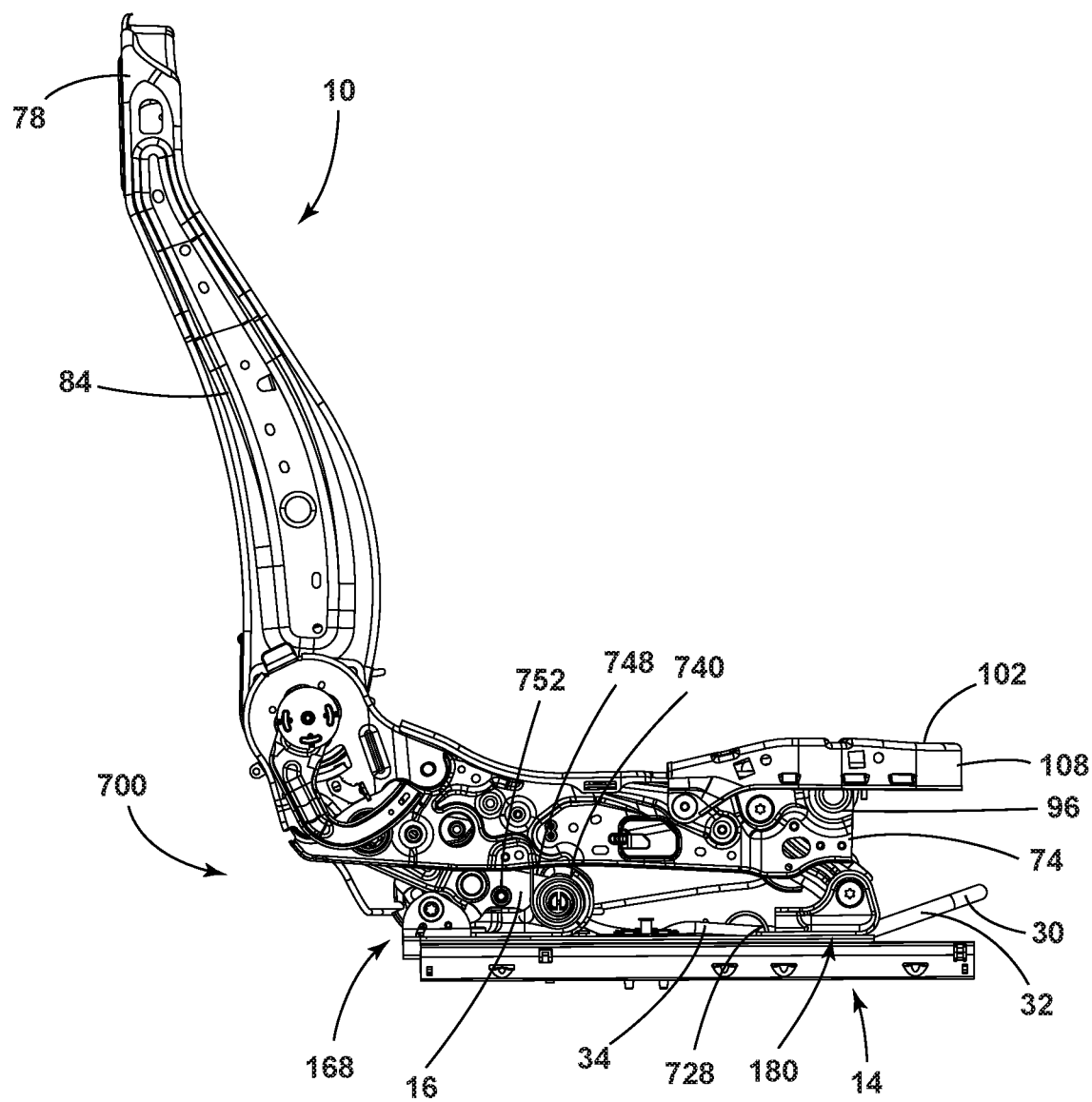
FIG. 12B is a first side elevational view of the frame of FIG. 12A with the four-way pitching mechanism in the design position.
Figure 12C:
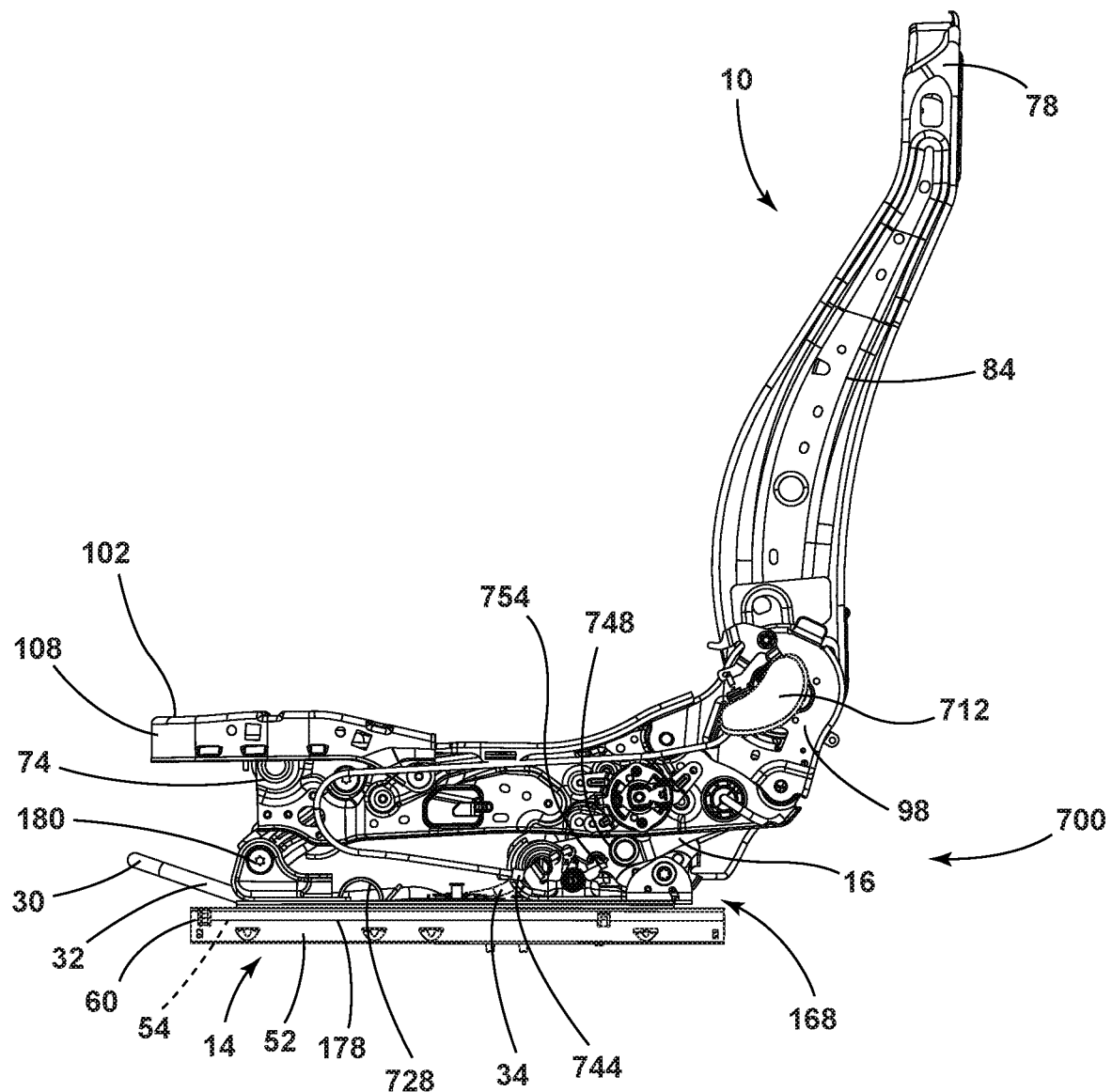
FIG. 12C is a second side elevational view of the frame of FIG. 12A with the four-way pitching mechanism in the design position.

Referring now to FIGS. 12A-12C, the release bar 30 is operably coupled to the seating assembly 10. The release bar 30 includes the front portion 32 and the rear portion 34 operably coupled by a torsion spring 728. The torsion spring 728 acts as a joining spring for the front portion 32 and the rear portion 34. The front portion 32 extends forward of the seating assembly 10 and the rear portion 34 extends beneath the base frame 74, parallel to and substantially flush with the track assembly 14. The torsion spring 728 is operably coupled to the track assembly 14 and may be a standard torsion spring 728 configured to transfer a rotary force from the front portion 32 to the rear portion 34.

Referring now to FIGS. 12B and 12C, a first clock spring 740 is disposed on the striker plate 192 disposed below the first horizontal support 96 (FIG. 12B) and a second clock spring 744 is disposed on the striker plate 192 disposed below the second horizontal support 98 (FIG. 12C). Each of the first and second clock springs 740, 744 includes an arm 748 engageable with one of a first tab 752 or a second tab 754. Each of the first and second tabs 752, 754 is disposed on the respective sector arm 16. The arm 748 of the second clock spring 744 is engaged with the second tab 754 when the seating assembly 10 is in the design position. The second tab 754 abuts the arm 748 of the second clock spring 744, forcing the second clock spring 744 into a loaded position. The arm 748 of the first clock spring 740 extends upward and is unloaded when the seating assembly 10 is in the design position D. The first clock spring 740 is configured to engage with the first tab 752 and be forced into a loaded position when the seating assembly 10 is in the pitched position P.

Figure 13:
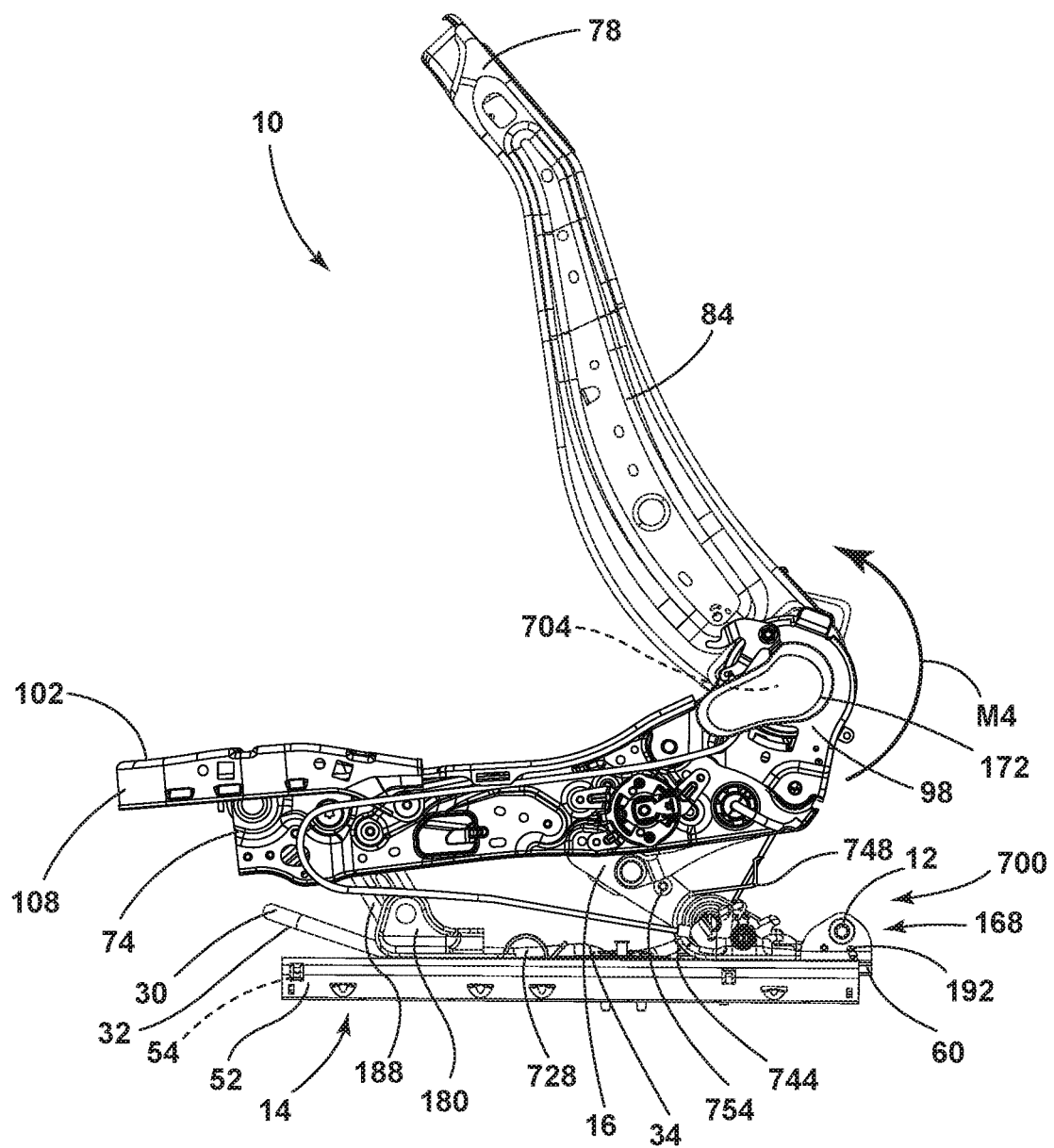
FIG. 13 is a side elevational view of a frame with a four-way pitching mechanism moved to a pitched position.
Figure 14A:
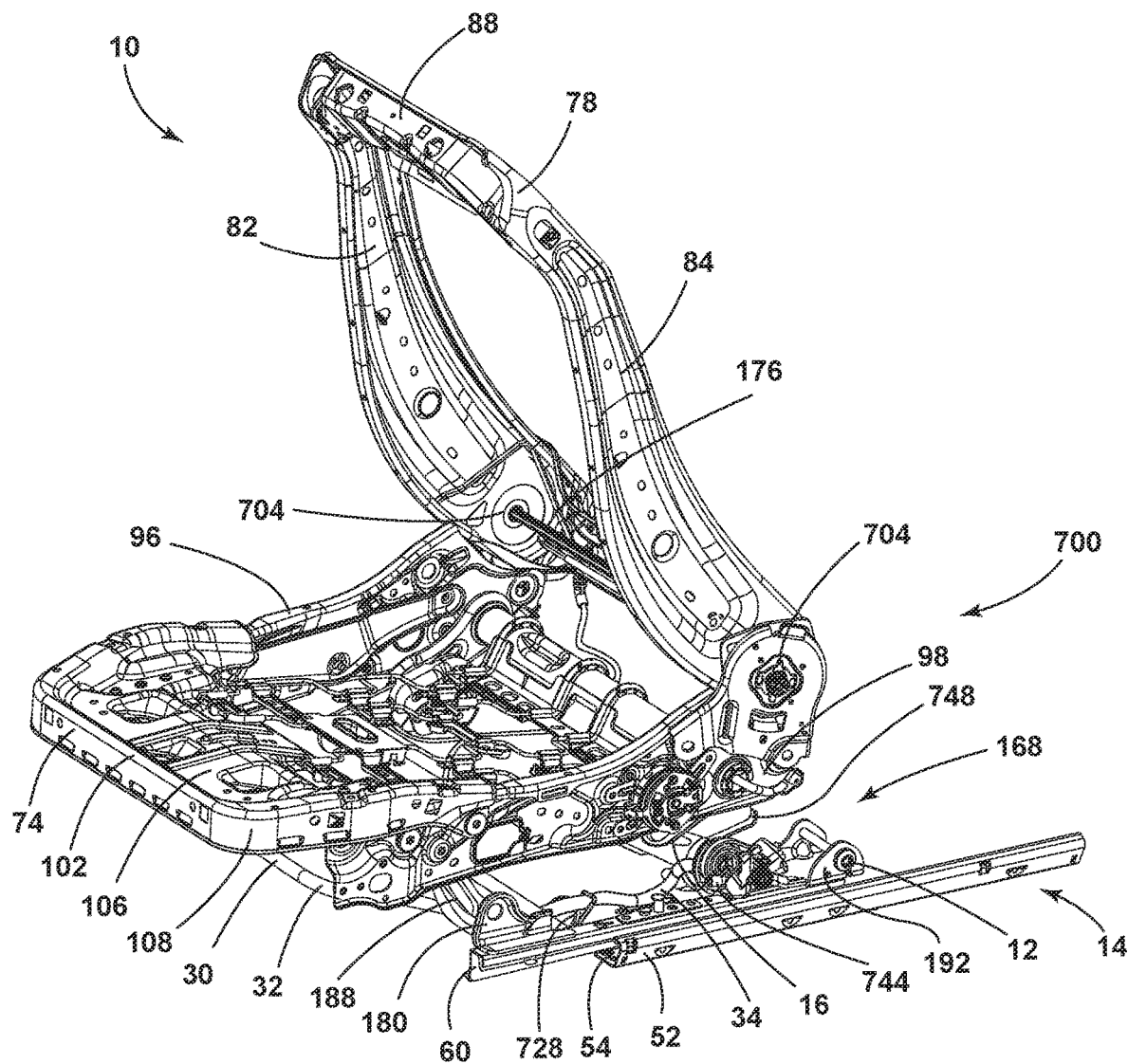
FIG. 14A is a top perspective view of a frame of a vehicle seating assembly with a four-way pitching mechanism in a pitched position and slid forward.
Figure 14B:
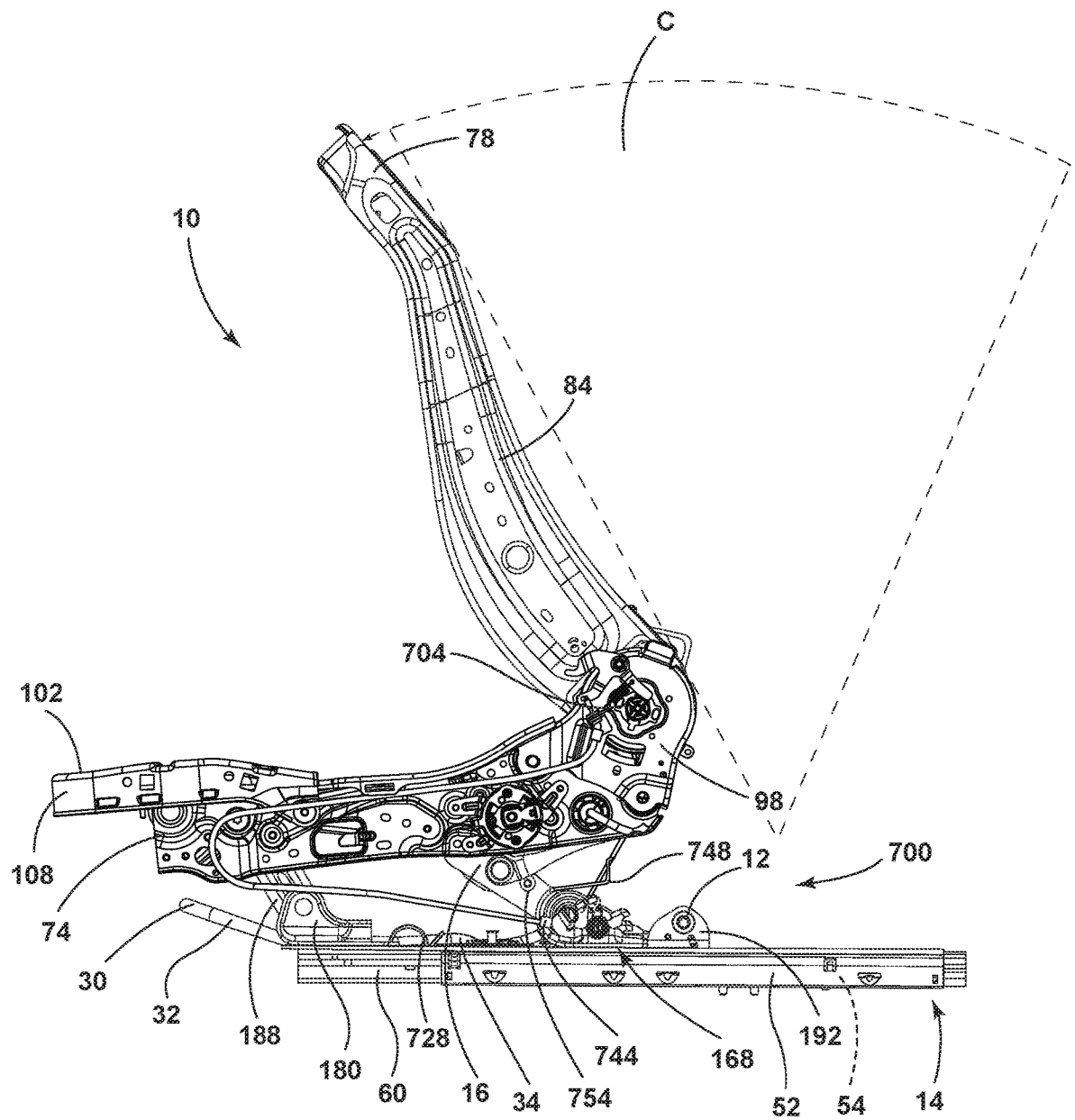
FIG. 14B is a side elevational view of the frame with the four-way pitching mechanism of FIG. 14A in a pitched position and slid forward.

Referring now to FIG. 13, the seating assembly 10 is shown in the pitched position P including the four-way pitching mechanism 700 actuatable by the actuator 712. The base frame 74 is operably coupled to the track assembly 14 by the plurality of rail slides 60 disposed within the plurality of tracks 52. The hinge 180 includes the hinge arm 188 and the hinge base 184, operably coupled to one of the plurality of rail slides 60, as shown previously in FIG. 3B. The latch assembly 168 includes the striker plate 192 and the dual cam latch 24, as also shown previously in FIG. 3B. The latch assembly 168 further includes the sector arm 16. The sector arm 16 may be the single elongated member 298 as illustrated in FIGS. 3A and 3B. Alternatively, the sector arm 16 may include multiple components, as shown in FIG. 13. When actuated by the actuator 712, a moment is applied at the pivots 704 about the transverse connector 176 as shown by arrow M4. The moment M4 is in a generally counterclockwise direction and inclines the back frame 78 forward. When the back frame 78 is inclined forward, the latch assembly 168 is unlocked, allowing the sector arm 16 and the hinge arm 188 to move into the pitched position P. As shown in FIGS. 14A and 14B, the base frame 74 subsequently may move in a generally forward direction when the plurality of rail slides 60 are released. When the seating assembly 10 includes the four-way pitching mechanism 700, the base frame 74 remains generally parallel to the track assembly 14 in the four-way pitched position while the back frame 78 inclines forward at an angle.

Figure 7B:
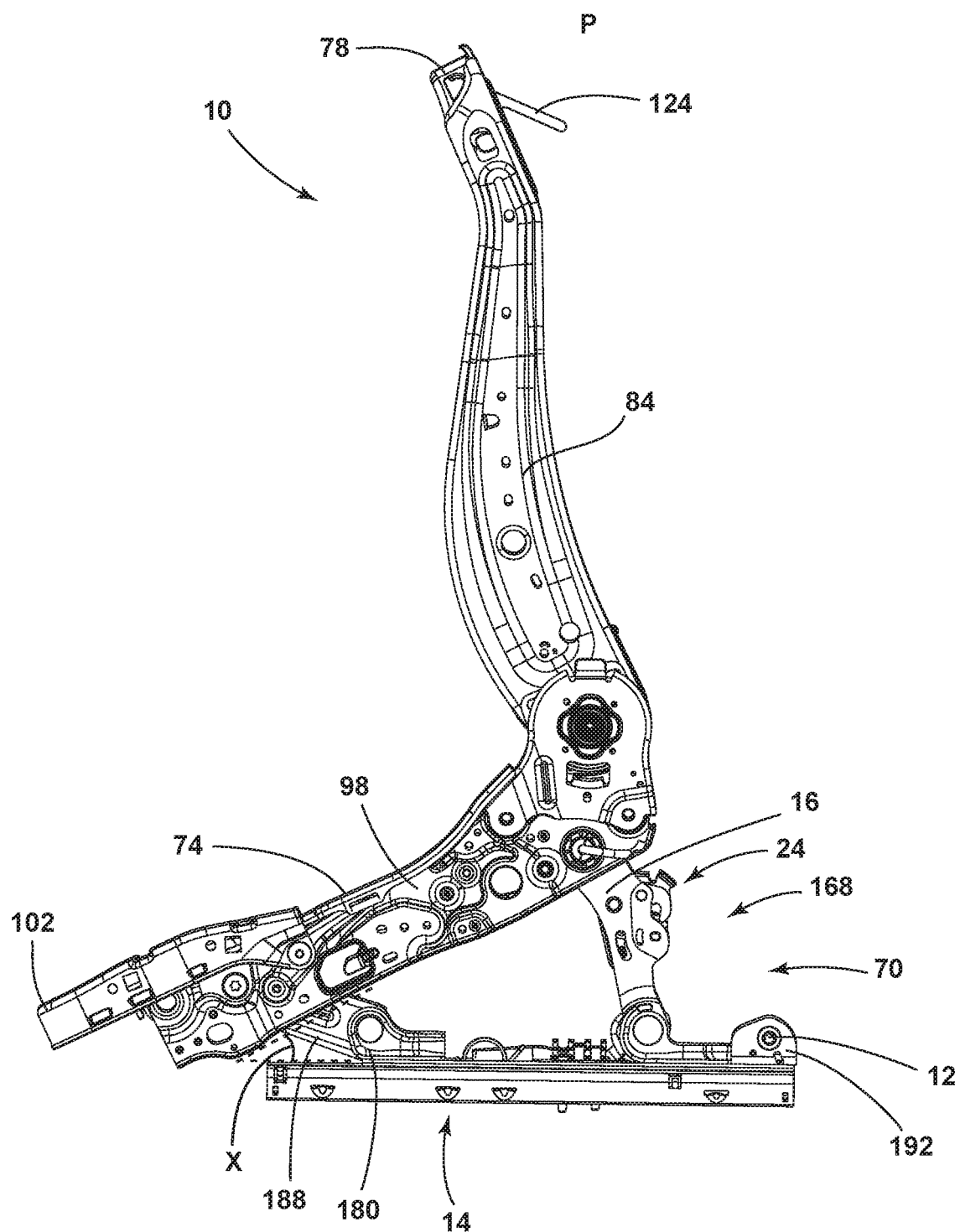
FIG. 7B is a side elevational view of the frame of FIG. 7A with the two-way pitching mechanism in the pitched position.

Referring now to FIGS. 14A and 14B, the seating assembly 10 is shown in the pitched position with the plurality of rail slides 60 extended from the channels 54 defined by the plurality of tracks 52, moving the seating assembly 10 to a forward position relative to the track assembly 14. When the dual cam latch 24 is unlocked by the actuator 712, the latch assembly 168 subsequently engages the release bar 30 to allow the seating assembly 10 to be slid forward along the track assembly 14 into the forward position. When the seating assembly 10 is in the forward position, the cone of entry C of the seating assembly 10 is larger than when the seating assembly 10 is in the pitched position P (FIG. 13) without forward movement or when the seating assembly 10 includes a two-way pitching mechanism 70 (FIGS. 6-7B).

Referring now to FIGS. 12A-14B, the first and second clock springs 740, 744 may be operably coupled to one of the latch assemblies 168 and one of the striker plates 192. The second clock spring 744 provides a first spring force to the tab 754 when the second clock spring 744 is released from the loaded position. The force exerted by the second clock spring 744 assists the user in pitching the base frame 74 forward when the seating assembly 10 is being moved to the pitched position P. Alternatively, the first clock spring 740 is loaded when the seating assembly 10 is in the pitched position. The first clock spring 740 provides a second spring force on the tab 752 when the first clock spring 740 is released from the loaded position. The force exerted by the first clock spring 740 assists the user in returning the seating assembly 10 to the design position D by propelling the sector arm 16 and, subsequently, the base frame 74 backward to lock the seating assembly 10 into the design position D.

Figure 15:
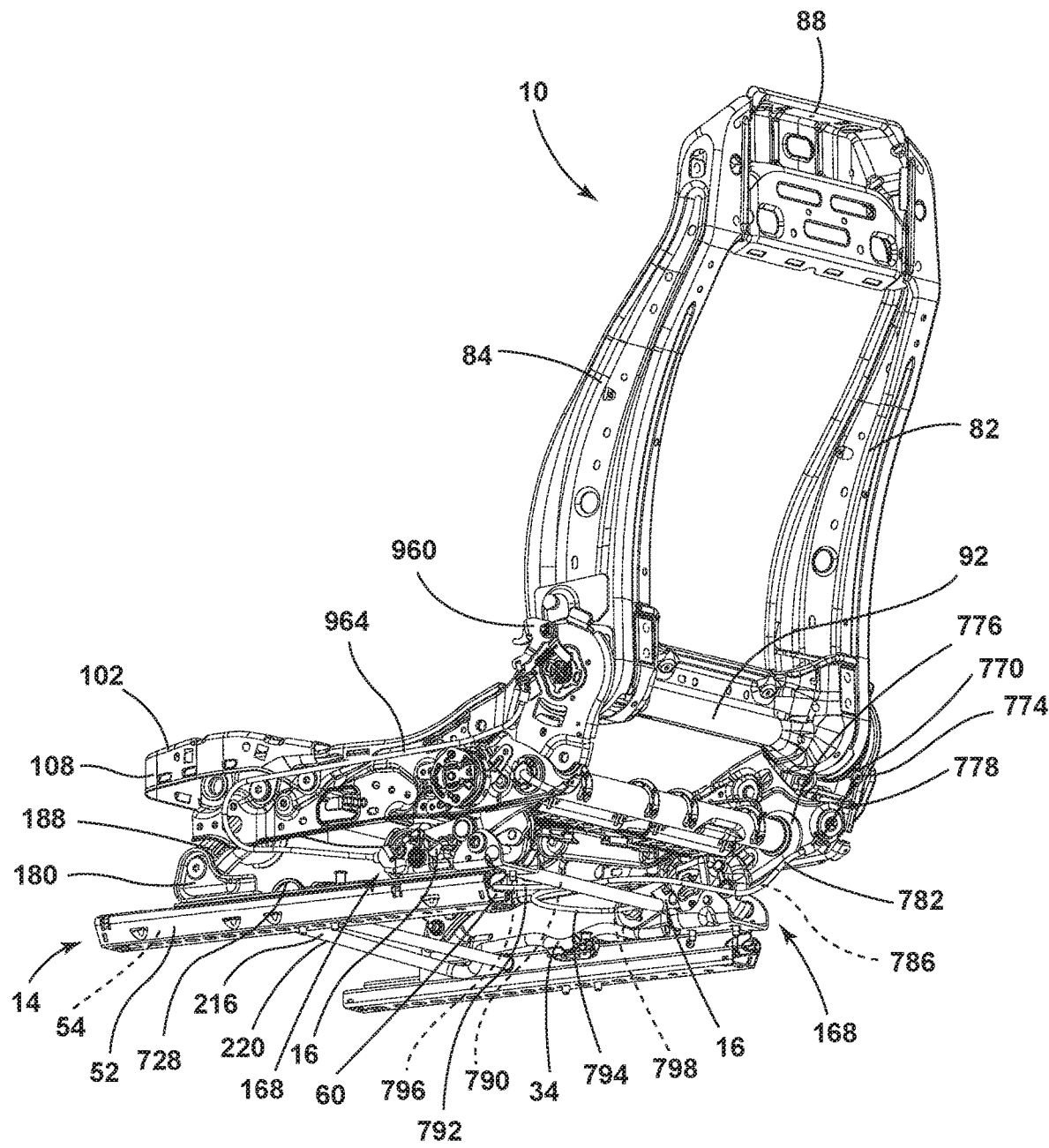
FIG. 15 is a rear bottom perspective view of a frame of a vehicle seating assembly with a four-way pitching mechanism.

Referring now to FIG. 15, the back frame 78 includes a protrusion 770 on the first vertical support 82. The protrusion 770 defines a connection opening 774 configured to receive an actuation member 778. In the present embodiment, the actuation member 778 is shown as a cable; however, it is contemplated that any type of member configured to provide tension to the latch assembly 168 may be used. It is also contemplated that the protrusion 770 may be disposed in any position on the back frame 78 without departing from the scope of the present disclosure. The actuation member 778 is positioned so that tension is placed on the actuation member 778 by the back frame 78 when the back frame 78 is inclined. The actuation member 778 may be operably coupled to a first cable 786 encased by a first cable sleeve 782. The first cable 786 may interface with a standard splitter 790. The standard splitter 790 may operably couple the first cable 786 to first and second latch cables 796, 798. The first and second latch cables 796, 798 may be encased by a second cable sleeve 792 and a third cable sleeve 794. It will be understood that the first cable 786 may be a single cable, a plurality of individual cables, or a plurality of intertwined cables. It will further be understood that the first latch cable 796 and the second latch cable 798 may be integrally formed with the first cable 786 or the first and second latch cables 796, 798 may be a single cable. The first cable 786 and the first and second latch cables 796, 798 may be connected by any means as understood in the art. Further, it is contemplated that the first cable 786 and the first and second latch cables 796, 798 may be exposed on the underside of the base frame 74 without the cable sleeves 782, 792, 794 without departing from the scope of the present disclosure.

Figure 16A:
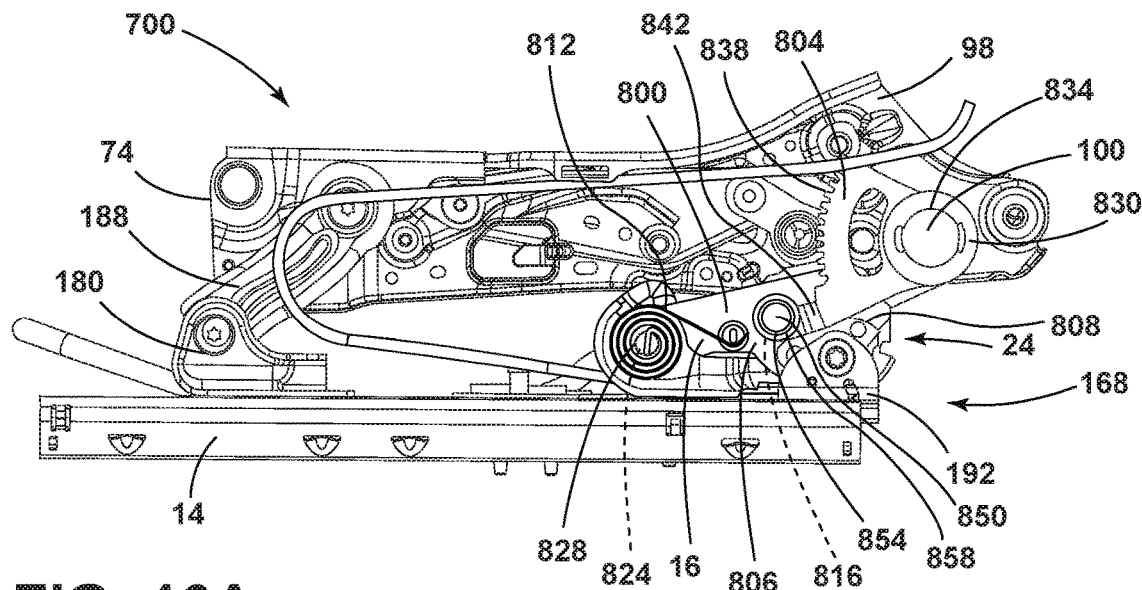
FIG. 16A is a side elevational view of a base frame of a vehicle seating assembly with a latch assembly in a design position.
Figure 16B:
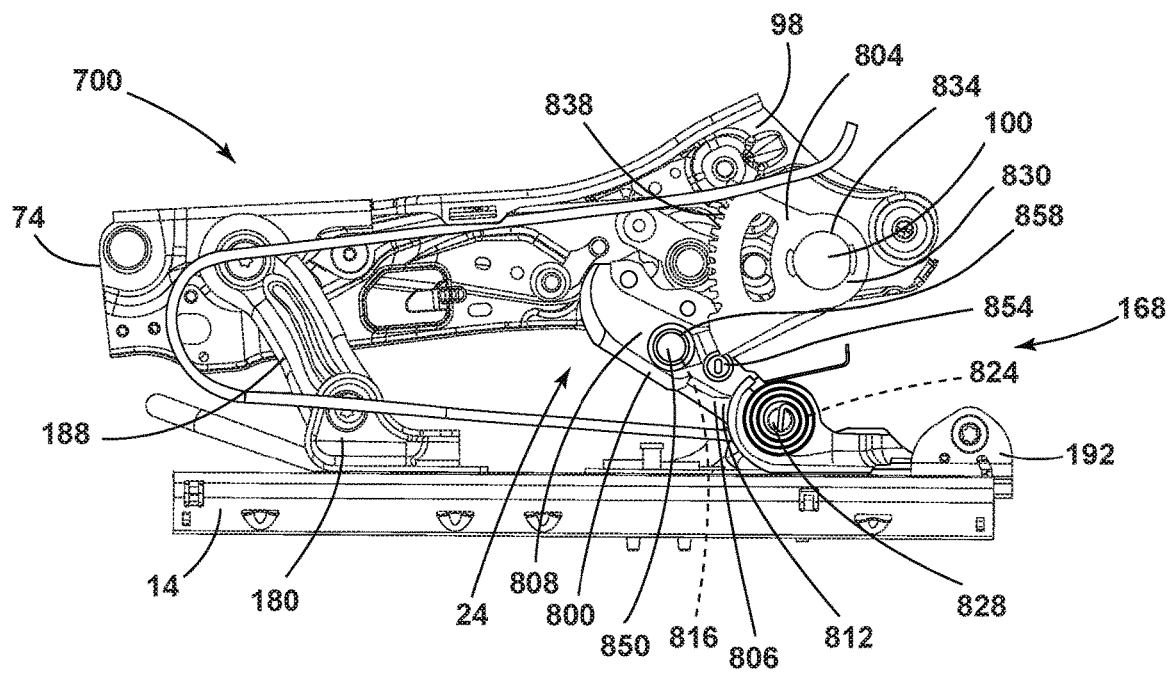
FIG. 16B is a side elevational view of the base frame of FIG. 16A of the vehicle seating assembly with a latch assembly in a pitched position.

Referring now to FIGS. 16A and 16B, the latch assembly 168 is shown for the four-way pitching mechanism 700. It will be understood that the dual cam latch 24 is similar to the dual cam latch 24 shown in the two-way pitching mechanism 70 in FIGS. 3A-11D. Where features are similar, the same reference numerals are used. The four-way pitching mechanism 700 includes the sector arm 16 including a first arm 800 and a second arm 804. The first arm 800 is an elongated member 806 and includes a first end 808 and a second end 812. The first end 808 is generally wider than the second end 812 and defines a first pivot aperture 816 where the first end 808 begins to narrow. The first pivot aperture 816 is configured to receive a first pivot pin 850 to operably couple the first arm 800 to the second arm 804. The second end 812 of the first arm 800 defines a second pivot aperture 824. The second pivot aperture 824 of the first arm 800 aligns with the second pivot aperture 218 of the striker plate 192 and is secured by a second pivot pin 828. The latch assembly 168 rotates around the second pivot pin 828 when moving from the design position D to the pitched position P.

Referring still to FIGS. 16A and 16B, the second arm 804 of the sector arm 16 is generally triangular in shape and includes a non-linear vertex 830. The second arm 804 defines a first pivot aperture 834 at the vertex 830 configured to operably couple to the torsion bar 100 of the base frame 74. It is contemplated that the first pivot aperture 834 may be operably coupled to any part of the base frame 74 without departing from the scope of the present disclosure. The second arm 804 further includes a non-linear gear edge 838 opposite the vertex 830 and a protrusion 842 extending from an end of the gear edge 838. The protrusion 842 includes a circular end 858 defining an aperture 854. The aperture 854 is configured to align with the first pivot aperture 816 of the first arm 800 and is secured by the first pivot pin 850. The first pivot pin 850 is configured to allow the first arm 800 to rotate into the pitched position without adjusting the second arm 804. When the latch assembly 168 is released, the first arm 800 of the sector arm 16 rotates into the pitched position P, leaving the second arm 804 stationary. The second arm 804 may be moved independently from the first arm 800, as described elsewhere herein.

Figure 17A:
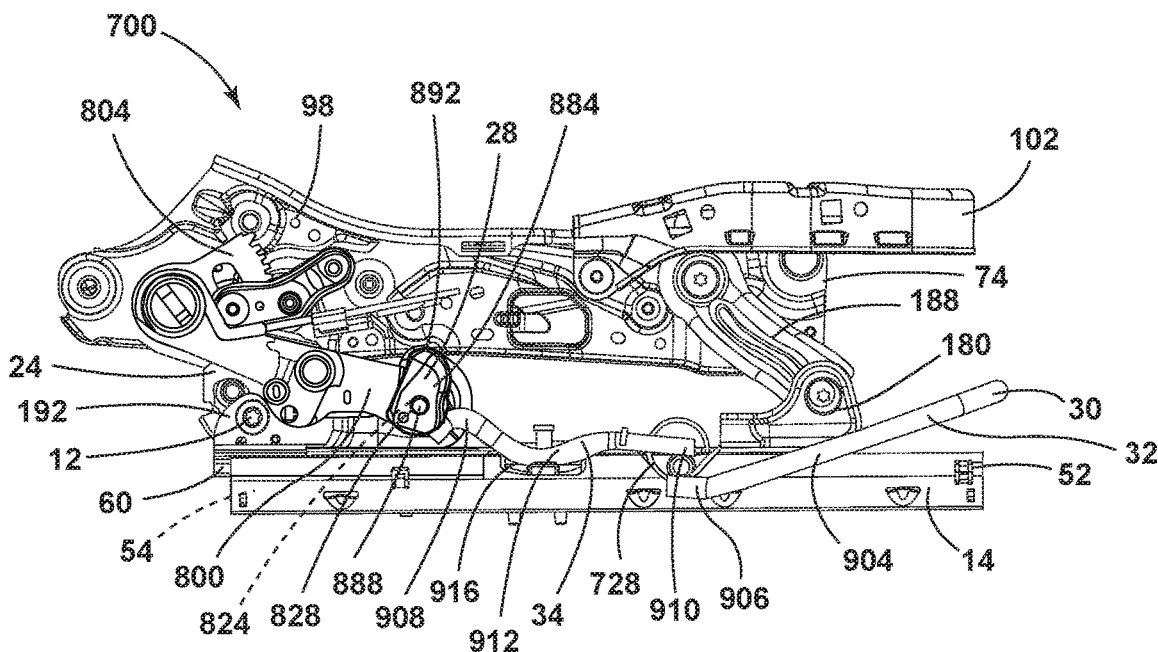
FIG. 17A is an inside elevational view of a base frame of a vehicle seating assembly and towel bar in a design position.
Figure 17B:
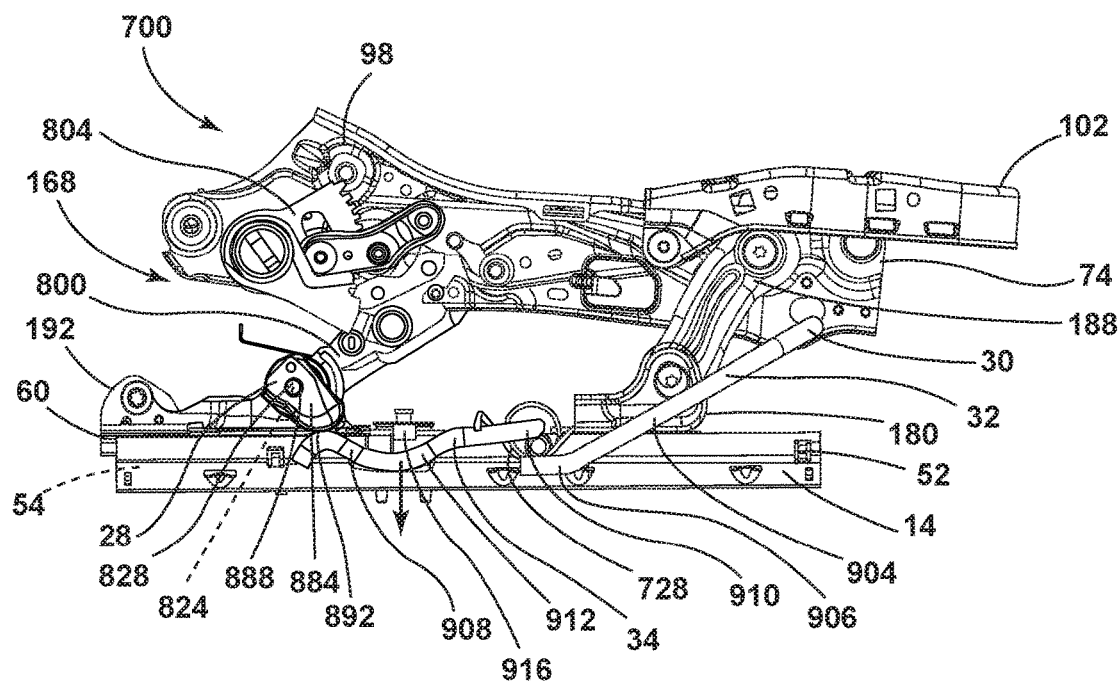
FIG. 17B is an inside elevational view of the base frame and towel bar of FIG. 17A in a pitched position.

Referring now to FIGS. 17A and 17B, the release cam 28 is operably coupled to the first arm 800 of the sector arm 16 by the second pivot pin 828. The release cam 28 includes a body portion 884 defining a connection aperture 888. A foot 892 extends perpendicularly to the body portion 884. The release cam 28 is fixedly coupled to the first arm 800 of the sector arm 16 so that the release cam 28 pivots with the first arm 800 when the sector arm 16 is rotated about the second pivot pin 828. The release bar 30 is positioned beneath the base frame 74 and extends proximate to the release cam 28. The release bar 30 includes the rear portion 34 and the front portion 32. As shown in FIGS. 12A and 14A, the front portion 32 of the release bar 30 includes a forward bar 900 protruding from the base frame 74 toward the front of the seating assembly 10. The forward bar 900 is integrally formed with side bars 904 that are configured to extend beneath the base frame 74. Referring again to FIGS. 17A and 17B, each of the side bars 904 includes a spring end 906 positioned at a predetermined angle to the side bar 904. The spring end 906 is disposed to engage with the torsion spring 728. When the forward bar 900 of the front portion 32 is engaged, the spring end 906 subsequently engages the torsion spring 728. When the torsion spring 728 is engaged, the rear portion 34 engages a release spring 916.

Still referring to FIGS. 17A and 17B, the rear portion 34 includes a first curve 908 integrally formed with a second curve 912. The second curve 912 is an inverted curve of the first curve 908. The second curve 912 is integrally formed with a second spring end 910 and is selectively engageable with the release spring 916. The release spring 916 is operably coupled to the track assembly 14. When the second curve 912 is depressed, the release spring 916 is released to allow fore/aft movement of the base frame 74 relative to the track assembly 14. The second curve 912 may be depressed by the release cam 28 or by the user raising the front portion 32 of the release bar 30.

Referring still to FIGS. 17A and 17B, the release cam 28 is rotated into an engaged position when the latch assembly 168 is moved into the pitched position (FIG. 17B). When the release cam 28 is rotated into the engaged position, the release cam 28 extends generally downward to depress the rear portion 34 of the release bar 30. The release cam 28 engages the first curve 908 of the rear portion 34 of the release bar 30. When the first curve 908 is depressed, the second curve 912 engages the release spring 916 to allow fore/aft movement of the base frame 74 relative to the track assembly 14. It is contemplated that other configuration of the release spring 916 may be used. It is also contemplated that other shape configurations for the release bar 30 may be used without departing from the scope of the present disclosure.

Figure 18A:
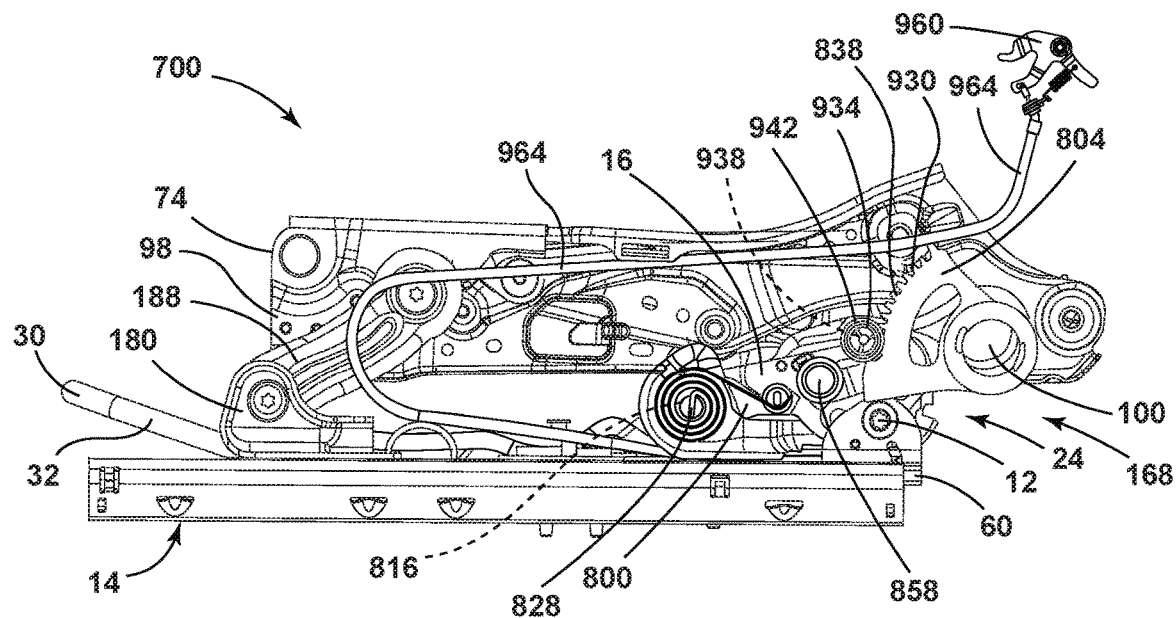
FIG. 18A is an outside elevational view of a base frame of a vehicle seating assembly with a gear in a lowered position.
Figure 18B:
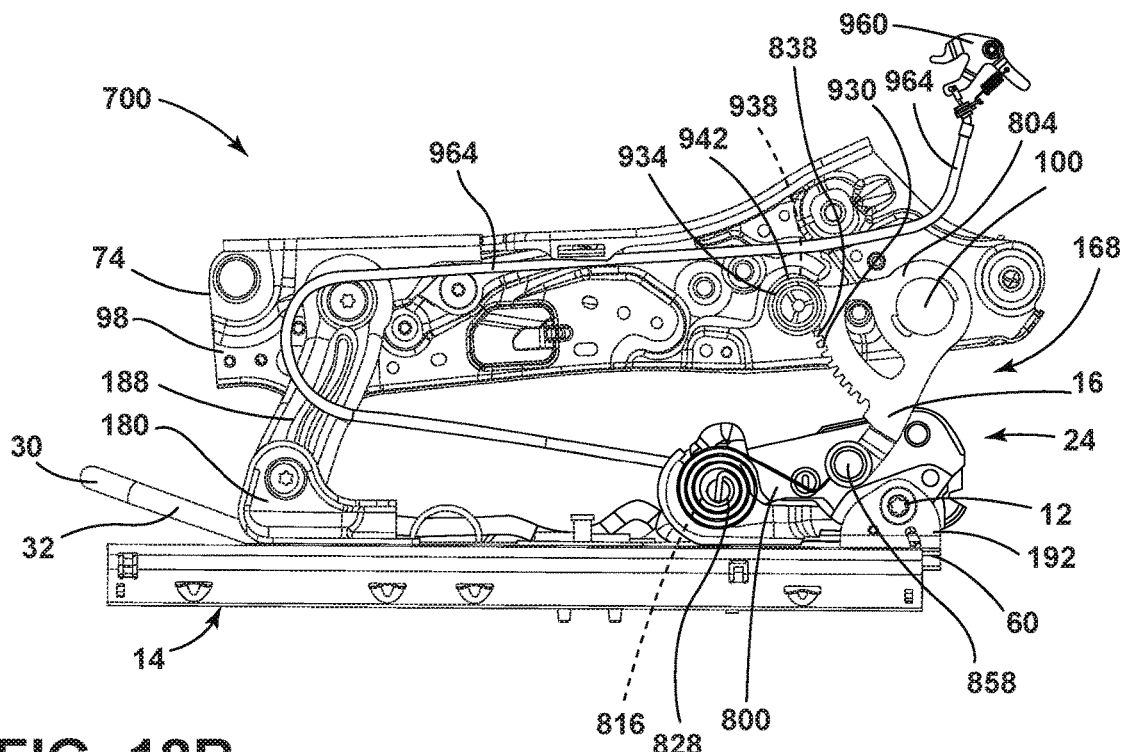
FIG. 18B is an outside elevational view of the base frame and the gear of FIG. 18A with the gear in a raised position.

Referring now to FIGS. 18A and 18B, the sector arm 16 is operable between the design position D (FIG. 18A) and the pitched position P (FIG. 18B). As discussed elsewhere herein, the second arm 804 of the sector arm 16 includes the gear edge 838. The gear edge 838 includes a plurality of gear teeth 930. A pinion 934 is disposed proximate to the gear edge 838. The pinion 934 is generally cylindrical and may include a plurality of gear slots 938 defined by a lateral edge 942 of the pinion 934. The plurality of gear teeth 930 is configured to be received by the plurality of gear slots 938. The plurality of gear teeth 930 and the plurality of gear slots 938 allow the second arm 804 to be selectively operable between the design position, the raised position, and a multitude of positions between the design position and the raised position. As shown in FIGS. 12B, 13, 14B, 15, 18A, and 18B, the pinion 934 is actuated using an actuator 960 and a cable 964 operably coupled to the base frame 74. When the actuator 960 is engaged, it ratchets the gear edge 838 upward to allow the second arm 804 to raise the base frame 74. As the second arm 804 raises, the hinge arm 188 gradually rotates as well to allow the base frame 74 to remain substantially parallel to the track assembly 14 as it raises. The second arm 804 is operable when the first arm 800 is in any position. By utilizing the raised position, it is possible to increase the cone of entry C shown in FIG. 14B to allow access to space rearward of the seating assembly 10. It will be understood that the number of gear teeth 930 illustrated in the present disclosure is exemplary only, and the number may be increased or decreased without departing from the scope of the present disclosure. It is also contemplated that the second arm 804 may be of any shape or size without departing from the scope of the present disclosure.

It will be understood by one having ordinary skill in the art that construction of the described concepts, and other components, is not limited to any specific material. Other exemplary embodiments of the concepts disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seating assembly comprising:
   a seat base operably coupled to a track assembly; and
   a latch assembly configured to couple the seat base to the track assembly and comprising:
   an arm including a first portion defining a first pivot aperture configured to receive a first pivot pin and a second portion defining a second pivot aperture configured to receive a second pivot pin, wherein the first pivot pin is a torsion bar directly coupled with the seat base, and further wherein the first portion is integrally formed with the second portion and extends at an obtuse angle from the second portion;
   a striker operably coupled to the second pivot pin and including a striker pin; and
   a dual cam latch operably coupled to the arm and disposed between the first pivot pin and the second pivot pin proximate a midpoint of the arm, wherein the dual cam latch is operable between a lowered position in which the latch assembly is engaged with the striker pin and a raised position in which the latch assembly is released, and further wherein the second portion of the arm is substantially perpendicular to a horizontal base of the striker when the dual cam latch is in the raised position.

2. The seating assembly of claim 1, wherein the dual cam latch includes a locking hook defining an opening.

3. The seating assembly of claim 2, wherein a first distance measured from the opening of the locking hook to the second pivot pin is generally equivalent to a second distance measured from the second pivot pin to the striker pin.

4. The seating assembly of claim 1, wherein the arm includes a first portion operably coupled to a second portion, and wherein the first pivot pin is operably coupled to the first portion and the second pivot pin is operably coupled to the second portion.

5. A seating assembly comprising:
   a seat base operably coupled to a track assembly;
   an arm operably coupled to a first pivot pin and a second pivot pin, wherein the first pivot pin is a torsion bar of the seat base;
   a striker plate disposed on the track assembly and operably coupled to the second pivot pin; and
   a dual cam latch disposed between the first pivot pin and the second pivot pin proximate a midpoint of the arm and configured to engage a striker pin when in a lowered position, wherein the arm includes a first portion integrally formed with a second portion, the first portion extending at an obtuse angle from the second portion.

6. The seating assembly of claim 5, wherein the dual cam latch includes a locking hook defining an opening.

7. The seating assembly of claim 6, wherein the striker plate includes the striker pin configured to be received by the opening of the locking hook.

8. The seating assembly of claim 7, wherein the dual cam latch is operably coupled to the arm by an arbor pin such that the opening of the locking hook is a first distance from the second pivot pin.

9. The seating assembly of claim 8, wherein the striker pin is a second distance from the second pivot pin, and wherein the second distance is generally equivalent to the first distance.

10. The seating assembly of claim 6, wherein the arm includes a first end and a second end, and further wherein the first end is operably coupled to the first pivot pin and the second end is operably coupled to the second pivot pin.

11. The seating assembly of claim 10, wherein the first end is disposed at a predetermined angle relative to the opening of the dual cam latch, and further wherein the angle disposes the seat base to be substantially parallel to the track assembly when the dual cam latch is in the lowered position.

12. A seating assembly comprising:
   a seat base operably coupled to a track assembly; and
   a latch assembly comprising:
   a striker plate operably coupled to the track assembly;
   an arm operably coupled to the seat base and the striker plate, the arm having a first portion integrally formed with a second portion, the first portion extending at an obtuse angle from the second portion; and
   a dual cam latch operably coupled to the arm and disposed between first and second ends of the arm, wherein the second portion is substantially perpendicular to a base of the striker plate when the dual cam latch is in a raised position.

13. The seating assembly of claim 12, wherein the striker plate includes a striker pin.

14. The seating assembly of claim 13, wherein the dual cam latch includes a locking hook defining an opening configured to receive the striker pin.

15. The seating assembly of claim 14, wherein the first end defines a first pivot axis and the second end defines a second pivot axis.

16. The seating assembly of claim 13, wherein the second end is disposed a first distance from the second pivot axis, and further wherein the striker pin is disposed at a second distance from the second pivot axis.

17. The seating assembly of claim 16, wherein the first distance is generally equivalent to the second distance.

18. The seating assembly of claim 14, wherein the obtuse angle is configured to position the seat base parallel to the track assembly when the locking hook is engaged with the striker pin.

19. The seating assembly of claim 12, wherein the dual cam latch is secured to the arm and a cover by an arbor pin.

20. The seating assembly of claim 12, wherein the arm is a single continuous piece configured to support some part of the seat base.

* * * * *